US011721260B2

(12) United States Patent
Bang et al.

(10) Patent No.: US 11,721,260 B2
(45) Date of Patent: *Aug. 8, 2023

(54) DISPLAY APPARATUS AND METHOD OF MANUFACTURING THE SAME

(71) Applicant: Samsung Display Co., Ltd., Yongin-Si (KR)

(72) Inventors: Joohyuk Bang, Yongin-si (KR); Sungjin Ma, Yongin-si (KR); Yijoon Ahn, Yongin-si (KR); Inho Cho, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/688,559

(22) Filed: Mar. 7, 2022

(65) Prior Publication Data
US 2022/0189373 A1 Jun. 16, 2022

Related U.S. Application Data

(63) Continuation of application No. 16/408,385, filed on May 9, 2019, now Pat. No. 11,270,613.

(30) Foreign Application Priority Data

May 10, 2018 (KR) ........................ 10-2018-0053926

(51) Int. Cl.
G09G 3/20 (2006.01)
G02F 1/1343 (2006.01)
(Continued)

(52) U.S. Cl.
CPC ............. G09G 3/20 (2013.01); G02F 1/1343 (2013.01); H04N 7/144 (2013.01); H04N 23/54 (2023.01);
(Continued)

(58) Field of Classification Search
CPC .... G09G 3/20; G09G 2380/02; G02F 1/1343; H04N 5/2253; H04N 5/2254; H04N 7/144
See application file for complete search history.

(56) References Cited

U.S. PATENT DOCUMENTS 9,001,184 B2 4/2015 Son et al.
9,277,172 B2 3/2016 Choi
(Continued)

FOREIGN PATENT DOCUMENTS

JP 2007-082107 A 3/2007
KR 10-2013-0064486 A 6/2013
(Continued)

OTHER PUBLICATIONS

Extended European Search Report, Application No. 19173763.4, dated Jun. 14, 2019, 18 pages.

*Primary Examiner* — Patrick N Edouard
*Assistant Examiner* — Eboni N Giles
(74) *Attorney, Agent, or Firm* — Innovation Counsel LLP

(57) ABSTRACT

A display apparatus includes a display panel including a first display portion including, the first display portion including a first area and a second area alternately arranged in one direction, a first emission device being disposed in the first area and the second area being located adjacent to the first area and configured to transmit external light, an electronic component facing one surface of the display panel and arranged corresponding to at least the second area, and a transmittance control component between the display panel and the electronic component and configured to control transmittance of the second area.

20 Claims, 26 Drawing Sheets

(51) Int. Cl.
  H04N 7/14       (2006.01)
  H04N 23/54      (2023.01)
  H04N 23/55      (2023.01)
(52) U.S. Cl.
  CPC ......... H04N 23/55 (2023.01); *G09G 2380/02* (2013.01)

(56) References Cited

U.S. PATENT DOCUMENTS

| | | | |
|---|---|---|---|
| 2010/0013380 A1* | 1/2010 | Kim | H10K 50/841 |
| | | | 313/504 |
| 2013/0135328 A1* | 5/2013 | Rappoport | G09G 3/3225 |
| | | | 345/82 |
| 2013/0147851 A1* | 6/2013 | Yim | G09G 3/2074 |
| | | | 345/690 |
| 2013/0176484 A1 | 7/2013 | Pilliod et al. | |
| 2013/0328022 A1 | 12/2013 | Choi et al. | |
| 2015/0169006 A1* | 6/2015 | Chong | G06F 1/1652 |
| | | | 345/1.3 |
| 2016/0079322 A1* | 3/2016 | Kim | H10K 71/135 |
| | | | 438/34 |
| 2016/0365401 A1* | 12/2016 | Seo | H10K 59/1213 |
| 2017/0005155 A1* | 1/2017 | You | H10K 59/124 |
| 2017/0256747 A1 | 9/2017 | Lee et al. | |

FOREIGN PATENT DOCUMENTS

| | | |
|---|---|---|
| KR | 10-2013-0083153 A | 7/2013 |
| KR | 10-2013-0138883 A | 12/2013 |
| KR | 10-1462351 B1 | 11/2014 |
| KR | 10-2015-0005704 A | 1/2015 |
| KR | 10-2015-0069379 A | 6/2015 |
| KR | 10-2017-0104097 A | 9/2017 |

* cited by examiner

DISPLAY APPARATUS AND METHOD OF MANUFACTURING THE SAME

CROSS-REFERENCE TO RELATED APPLICATION

This application is a continuation application of U.S. patent application Ser. No. 16/408,385 filed on May 9, 2019, which claims priority under 35 USC § 119 to Korean Patent Application No. 10-2018-0053926, filed on May 10, 2018, in the Korean Intellectual Property Office, the disclosure of which is incorporated herein in its entirety by reference.

BACKGROUND

1. Field

One or more embodiments of the present disclosure are directed toward a display apparatus, and more particularly, to a display apparatus having a transmission area and a method of manufacturing the same.

2. Description of the Related Art

Recently, as development of display apparatuses decreases their thickness and weight, the range of uses for display apparatuses has increased. With display apparatuses being used in various pieces of equipment, a variety of sensors are mounted on the display apparatuses.

SUMMARY

One or more embodiments include a display apparatus which may include various sensors and have a reduced non-display area and a method of manufacturing the display apparatus.

Additional aspects will be set forth in part in the description which follows and, in part, will be apparent from the description, or may be learned by practice of the presented embodiments.

According to one or more embodiments, a display apparatus includes a display panel including a first display portion, the first display portion including a first area and a second area alternately arranged in one direction, a first emission device being disposed in the first area and the second area being located adjacent to the first area and configured to transmit external light, an electronic component facing one surface of the display panel and arranged to correspond to at least the second area, and a transmittance control component between the display panel and the electronic component and configured to control transmittance of the second area.

The display panel may further include a second display portion located adjacent to the first display portion, the second display portion including a second emission device and configured to not transmit the external light.

The display apparatus may further include a driver configured to drive each of the first display portion and the second display portion independently from each other.

The external light may include ambient light and light emitted from the electronic component.

The electronic component may include an image sensor, and the display apparatus may further include a lens between the transmittance control component and the image sensor.

The display apparatus may further include a controller configured to convert an optical signal passing through the lens and incident on the image sensor into image data and perform color restoration on the image data.

The display panel may include a first substrate having a first surface on which the first display portion is provided, and a second substrate sealing the first substrate, and the electronic component may face a second surface opposite to the first surface of the first substrate.

The transmittance control component may include the first substrate, a third substrate facing the second surface of the first substrate, and a transmittance control layer between the first substrate and the third substrate.

The first substrate may include a first part, a second part, and a bending part between the first part and the second part, a second surface of the first part and a second surface of the second part may face each other, the first display portion may be provided on a first surface of the first part, and the electronic component may be provided on a second surface of the second part.

The first emission device may include a first electrode positioned in the first area, a second electrode facing the first electrode, and an emission layer between the first electrode and the second electrode. An insulating film covering an edge of the first electrode may include an opening corresponding to the second area.

According to one or more embodiments, a display apparatus include a display panel including a display portion configured to displays an image, at least a part of the display portion including a transmission area configured to transmit external light, an electronic component facing a rear surface of the display panel and arranged to correspond to at least the transmission area, and a transmittance control component between the display panel and the electronic component and configured to control transmittance of the transmission area.

The electronic component may include an image sensor, and the display apparatus may further include a lens between the transmittance control component and the image sensor.

The display apparatus may further include a controller configured to convert an optical signal passing through the lens and incident on the image sensor into image data and perform color restoration on the image data.

The display panel may include a first substrate having a first surface on which the display portion including a plurality of pixels is provided and a second substrate sealing the first substrate. The electronic component may be disposed facing a second surface opposite to the first surface of the first substrate.

The first substrate may include a first part, a second part, and a bending part between the first part and the second part, a second surface of the first part and a second surface of the second part may face each other, the display portion may be provided on a first surface of the first part, and the electronic component may be provided on the second surface of the second part.

According to one or more embodiments, a method of manufacturing a display apparatus includes providing a display panel, the display panel including a display portion, the display portion including a first area and a second area alternately arranged in one direction, a emission device being disposed in the first area and the second area being located adjacent to the first area and configured to transmit external light, arranging an electronic component to face one surface of the display panel and to correspond to at least the second area, and arranging a transmittance control component between the display panel and the electronic component, the transmittance control component being configured to control transmittance of the second area.

The providing of the display panel may include arranging a first electrode on a first area of a first substrate, arranging an insulating film on the first electrode, the insulating film including a first opening that exposes a part of the first electrode and a second opening corresponding to the second area, arranging an emission layer on the first opening, arranging a second electrode in the first opening and the second opening, removing the second electrode from the second opening, and arranging a second substrate to correspond to the first substrate.

The method may further include, before the arranging of the second electrode in the second opening, arranging an adhesive layer in the second opening, wherein the removing of the second electrode from the second opening may include removing the adhesive layer and the second electrode from the second opening.

The method may further include arranging a lens between the transmittance control component and the electronic component.

The first substrate may include a first part, a second part, and a bending part between the first part and the second part, a second surface of the first part and a second surface of the second part may face each other, and the arranging of the electronic component may include arranging the electronic component on the second surface of the second part of the first substrate.

According to one or more embodiments, a display apparatus include a display panel including a first display portion, the first display portion including a first area and a second area alternately arranged in one direction, a first emission device being disposed in the first area and the second area being located adjacent to the first area and configured to transmit external light; and an electronic component facing one surface of the display panel and arranged to correspond to at least the second area. An electrode does not disposed in an area corresponding to the electronic component of the second area of the first display portion.

The external light may include ambient light and light emitted from the electronic component.

The first emission device may include a first electrode positioned in the first area, a second electrode facing the first electrode, and an emission layer between the first electrode and the second electrode. An insulating film covering an edge of the first electrode may include an opening corresponding to the second area.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
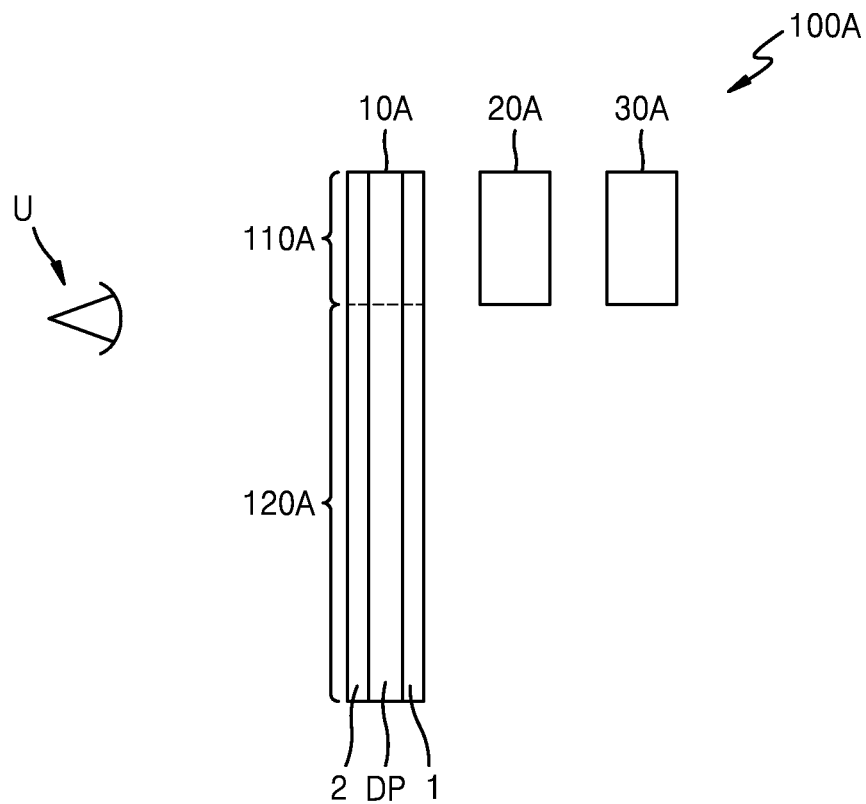
FIG. 1 is a schematic diagram of a display apparatus according to an embodiment.

As the present disclosure includes numerous embodiments, embodiments will be illustrated in the drawings and described in detail in the written description. However, this is not intended to limit the present disclosure to particular modes of practice, and it is to be appreciated that all changes, equivalents, and substitutes that do not depart from the spirit and technical scope of the present disclosure are encompassed in the present disclosure. In the description of the present disclosure, certain detailed explanations of the related art are omitted when it is deemed that they may unnecessarily obscure the essence of the disclosure.

It will be understood that although the terms "first," "second," etc. may be used herein to describe various components, these components should not be limited by these terms. These terms are only used to distinguish one component from another.

As used herein, the singular forms "a," "an" and "the" are intended to include the plural forms as well, unless the context clearly indicates otherwise.

It will be further understood that the terms "includes" and/or "including" used herein specify the presence of stated features or components, but do not preclude the presence or addition of one or more other features or components.

It will be understood that when a layer, region, or component is referred to as being "formed on" another layer, region, or component, it can be directly or indirectly formed on the other layer, region, or component. That is, for example, intervening layers, regions, or components may be present.

Sizes of components in the drawings may be exaggerated for convenience of explanation. In other words, since sizes and thicknesses of components in the drawings are arbitrarily illustrated for convenience of explanation, the following embodiments are not limited thereto.

When a certain embodiment may be implemented differently, a specific process order may be performed differently from the described order. For example, two consecutively described processes may be performed substantially at the same time or performed in an order opposite to the described order.

Hereinafter, the present disclosure will be described in detail by explaining example embodiments of the disclosure with reference to the attached drawings. Like reference numerals in the drawings denote like elements, and thus their description will be omitted.

Figure 2:
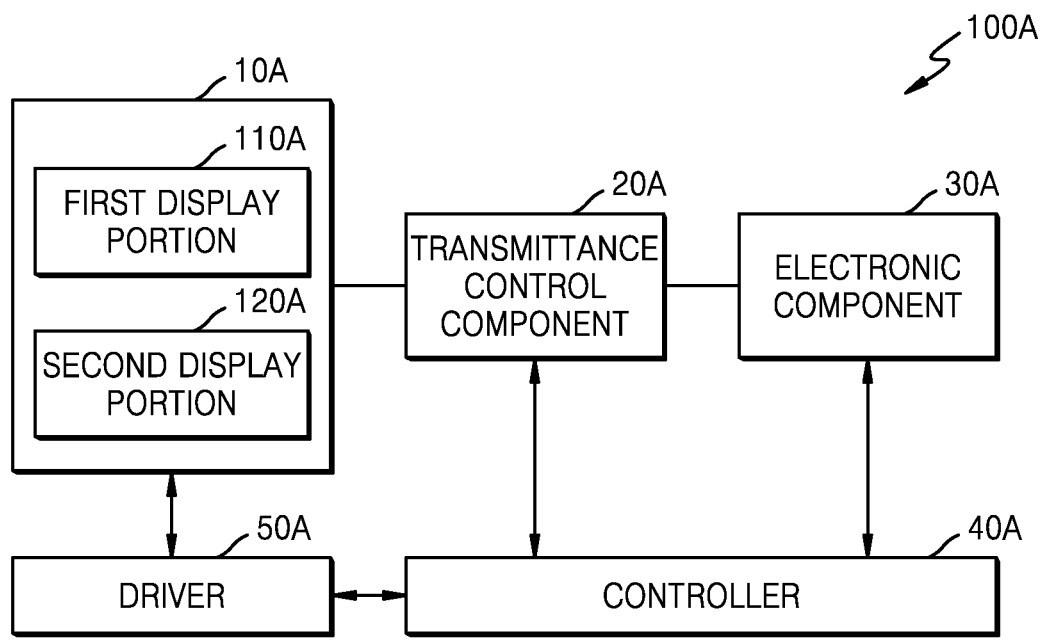
FIGS. 2 and 3 are schematic block diagrams of the display apparatus of FIG. 1.
Figure 3:
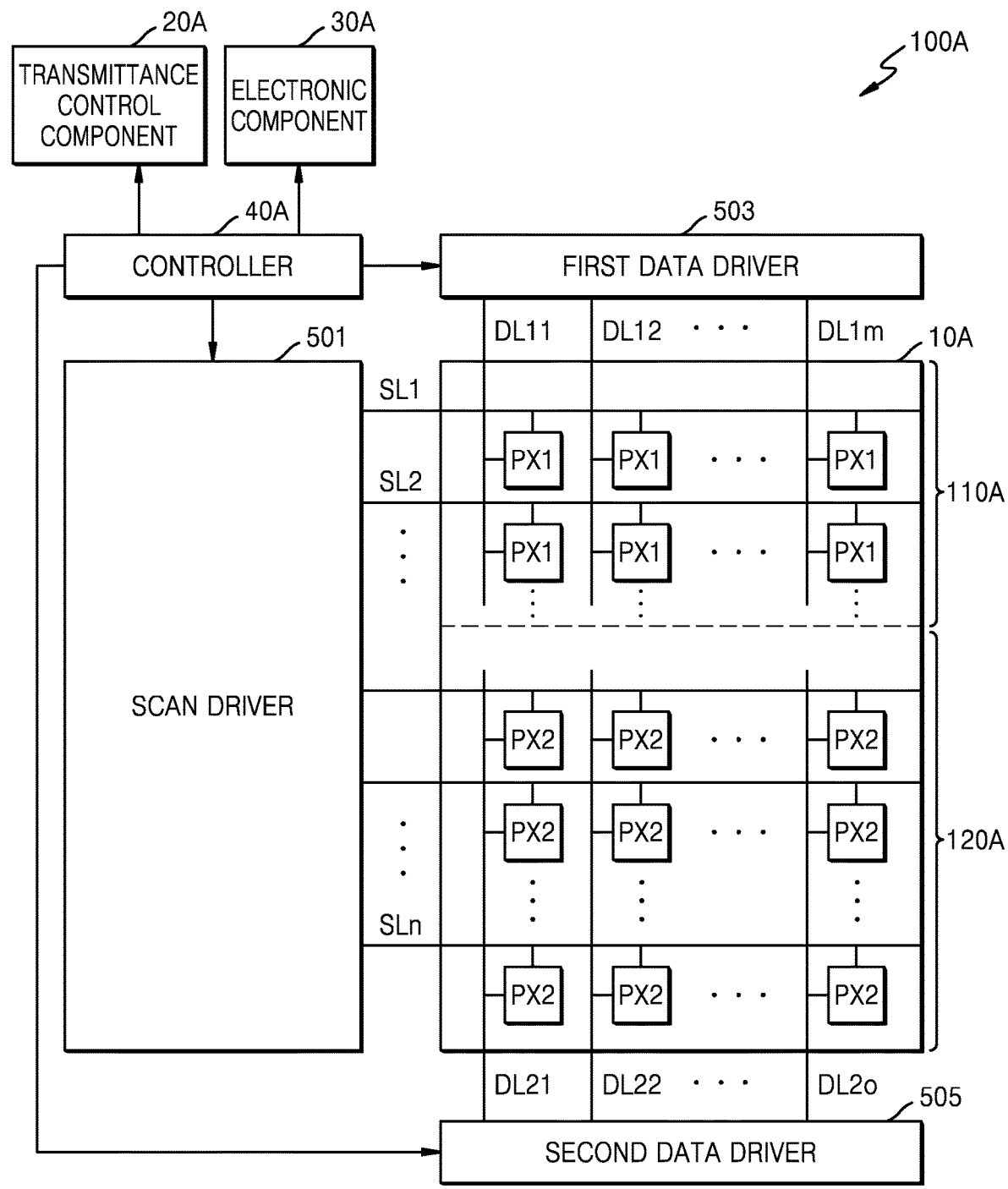

FIG. 1 is a schematic diagram of a display apparatus 100A according to an embodiment. FIGS. 2 and 3 are schematic block diagrams of the display apparatus 100A of FIG. 1.

Referring to FIGS. 1 to 3, the display apparatus 100A according to an embodiment of the present disclosure may include a display panel 10A, a transmittance control component 20A, an electronic component 30A, a controller 40A, and a driver 50A, each of which may be hardware components. Alternatively, at least some embodiments of the present disclosure may have any of the above listed elements implemented as software components.

The display apparatus 100A may be, but is not limited to, at least one of a liquid crystal display apparatus, an organic light-emitting display apparatus, an electrophoretic display apparatus, or an electrowetting display panel. In the following description, it is described as an example that the display apparatus 100A is an organic light-emitting display.

The display panel 10A may include a first substrate 1, a display portion DP including a plurality of pixels provided on the first substrate 1, and a second substrate 2 hermetically sealing the display portion DP. The first substrate 1 and the second substrate 2 may include each include at least one transparent material such as glass, silicone, synthetic resin, and/or aerogel. The display portion DP may include a first display portion 110A corresponding to an area in which the electronic component 30A is provided and a second display portion 120A located immediately adjacent to the first display portion 110A.

In the display portion DP, while a plurality of scan lines SL1 to SLn receiving scan signals from a scan driver 501 may extend in a row direction, a plurality of first data lines DL11 to DL1m receiving data signals from a first data driver 503 and a plurality of second data lines DL21 to DL2o receiving data signals from a second data driver 505 may extend in a column direction. The first data lines DL11 to DL1m connected to the first data driver 503 may be arranged in the first display portion 110A, and the second data lines DL21 to DL2o connected to the second data driver 505 may be arranged in the second display portion 120A. The number of the first data lines DL11 to DL1m and the number of the second data lines DL21 to DL2o may be the same as or different from each other.

In the first display portion 110A, a plurality of first pixels PX1 may be arranged in a certain pattern in a row direction and a column direction. The first pixel PX1 may be connected to one of the scan lines SL1 to SLn arranged in the first display portion 110A and to one of the first data lines DL11 to DL1m.

In the second display portion 120A, a plurality of second pixels PX2 may be arranged in a certain pattern in the row and column directions. The second pixel PX2 may be connected to one of the scan lines SL1 to SLn arranged in the second display portion 120A and to one of the second data lines DL21 to DL2o.

The first pixels PX1 of the first display portion 110A and the second pixels PX2 of the second display portion 120A may receive image signals from different data drivers from each other and the first pixels PX1 may display an image independently from the second pixels PX2. The first display portion 110A may be a transparent display portion that is switchable between a transparent state and an opaque state by the transmittance control component 20A.

The transmittance control component 20A may be provided on the side of at least one of a front surface and a rear surface of the display panel 10A. In an embodiment, the transmittance control component 20A may be provided on the side of the rear surface of the display panel 10A that is opposite to a side where a user U of the display panel 10A is located.

The transmittance control component 20A may include a material for controlling transmittance of light. The transmittance control component 20A may have a position and a size corresponding to those of the first display portion 110A. The transmittance control component 20A may have transmittance that is controlled according to a mode of the first display portion 110A. The transmittance of the transmittance control component 20A may be controlled such that the transmittance control component 20A is in the transparent state in a transparent mode of the first display portion 110A and in the opaque state in a black mode of the first display portion 110A.

An electronic component 30A may be a component using light, such as an image sensor, an optical sensor, a light source, a proximity sensor, or a biosensor. However, the electronic component 30A is not limited to the above-described example components, and may be a component such as a speaker, a microphone, an antenna, or a non-light based proximity sensor, or another type of component. One electronic component 30A may be provided corresponding to at least a transmission area 32 (FIG. 4) of the first display portion 110A. At least one of the above example components may be provided as the electronic component 30A.

The controller 40A may include a drive IC for driving the driver 50A, the electronic component 30A, and the transmittance control component 20A. The controller 40A may output a control signal to control driving of the electronic component 30A, and process an input signal of the electronic component 30A to output an output signal to an output unit. The output unit may be the first display portion 110A, the second display portion 120A, or another electronic component 30A. The controller 40A may generate a control signal for driving of the transmittance control component 20A according to a driving state of the electronic component 30A, to control the transmittance of the transmittance control component 20A. When the electronic component 30A is driven, the controller 40A may control the transmittance control component 20A to be in the transparent state to switch the state of the first display portion 110A to the transparent state. When the electronic component 30A is not driven, the controller 40A may control the transmittance control component 20A to be in the opaque state to switch the state of the first display portion 110A to the opaque state, thereby enabling a black display of the first display portion 110A. The controller 40A may output an image signal and a control signal to the driver 50A.

The driver 50A may include the scan driver 501, the first data driver 503, and the second data driver 505.

The scan driver 501 may generate, according to a preset order, scan signals to operate the first pixels PX1 and the second pixels PX2 according to a timing control signal of the controller 40A, and output the generated scan signals to the scan lines SL1 to SLn.

The first data driver 503 may convert an image signal to a data signal according to the timing control signal of the controller 40A, and output the data signal to the first data lines DL11 to DL1m.

The second data driver 505 may convert an image signal to a data signal according to the timing control signal of the controller 40A, and output the data signal to the second data lines DL21 to DL2o.

Figure 4:
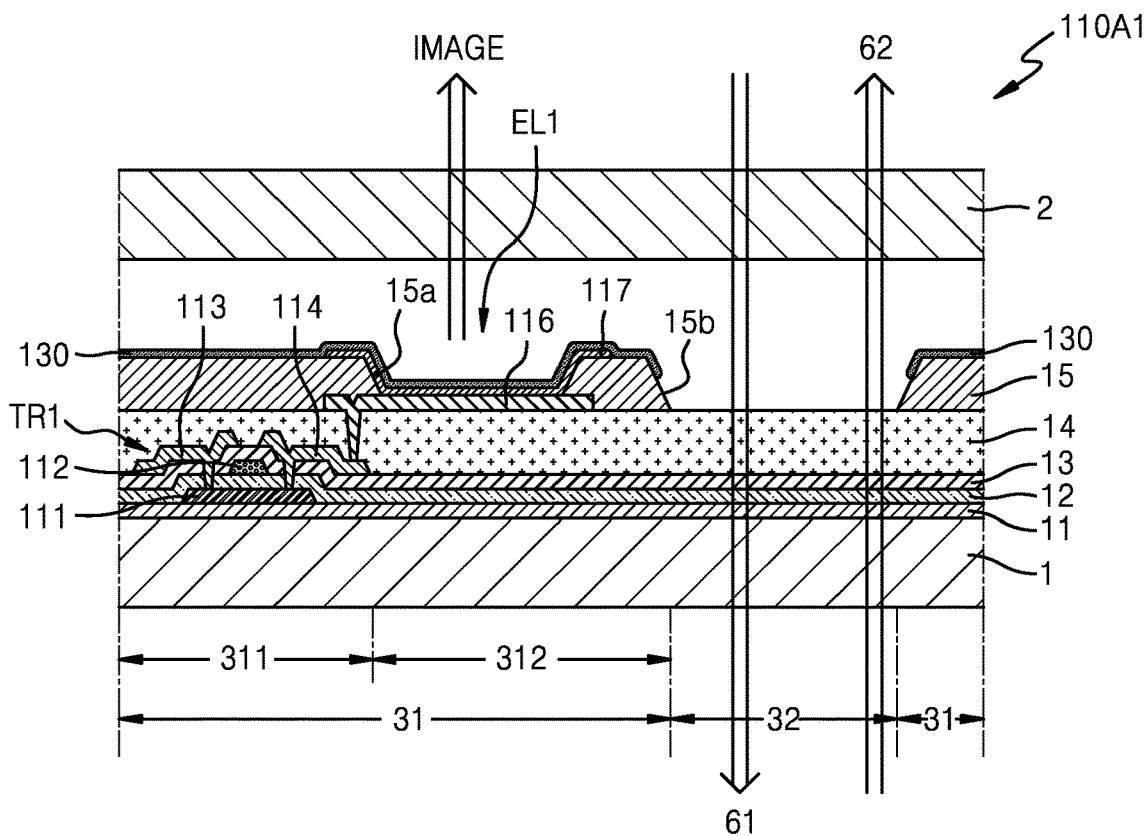
FIGS. 4 and 5 are respectively a cross-sectional view and a plan view illustrating an example of a first display portion according to an embodiment.
Figure 5:
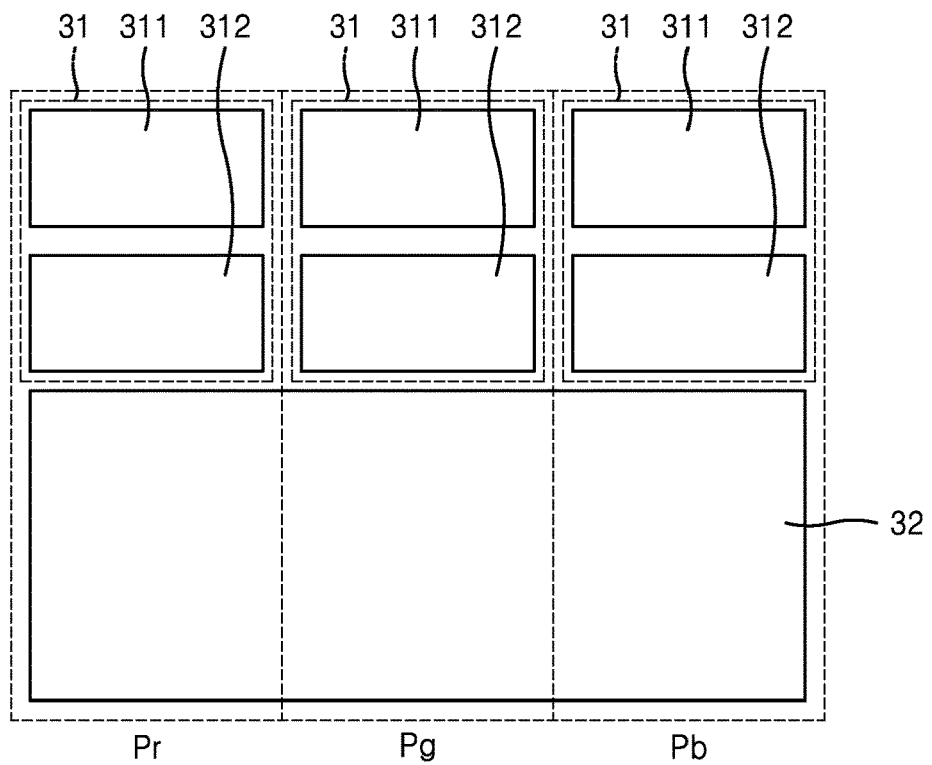

FIGS. 4 and 5 are, respectively, a cross-sectional view and a plan view illustrating an example of a first display portion 110A1 according to an embodiment.

Referring to FIGS. 4 and 5, the first display portion 110A1 may include a pixel area 31 and the transmission area 32 located adjacent to the pixel area 31 and allowing light to be transmitted through it. The light may be external light that is a different light from the light emitted by an emission device EL1 of the first pixel PX1. The external light may be ambient light or light emitted by the electronic component 30A.

First external light 61 and second external light 62 may be transmitted through the transmission area 32. The first external light 61 is transmitted in a direction from the outside of the second substrate 2 toward the outside of first substrate 1. The second external light 62 is transmitted in a direction from the outside of the first substrate 1 toward the outside of the second substrate 2. Since components and wirings are arranged to bypass the transmission area 32, the components and wirings may not be arranged in the transmission area 32. The transmission area 32 may not be provided with at least a fourth insulating film 15. An insulating film provided in the transmission area 32 may include a transparent insulating material.

The pixel area 31 may include an emission area 312 and a circuit area 311. The first pixel PX1 may be arranged in the pixel area 31. The emission device EL1 of the first pixel PX1 may be arranged in the emission area 312. A pixel circuit of the first pixel PX1, which is electrically connected to the emission device EL1 and includes a thin film transistor TR1, may be provided in the circuit area 311. The circuit area 311 and the emission area 312 are not overlapped with each other, and thus the emission device EL1 and the pixel circuit may be arranged close to each other not to overlap each other. The present disclosure is not limited to a case in which one thin film transistor TR1 is provided in the circuit area 311 illustrated in the drawing, and a plurality of thin film transistors and capacitors may be further included, and wirings such as scan lines, data lines, and power lines connected to the thin film transistors and capacitors may be further included.

The thin film transistor TR1 may include a semiconductor layer 111, a gate electrode 112, a source electrode 113, and a drain electrode 114, on a buffer layer 11. A first insulating film 12 between the semiconductor layer 111 and the gate electrode 112 may function as a gate insulating film, and a second insulating film 13 between the gate electrode 112, and the source electrode 113 and the drain electrode 114 may function as an interlayer insulating film.

The emission device EL1 may include a first electrode 116 on a third insulating film 14 that covers the thin film transistor TR1, a second electrode 130 facing the first electrode 116, and an intermediate layer 117 between the first electrode 116 and the second electrode 130. At least one edge of the first electrode 116 may be covered by the fourth insulating film 15. The emission device EL1 may be of a top emission type or a bottom emission type.

The first pixel PX1 may be, for example, a first red pixel Pr, a first green pixel Pg, or a first blue pixel Pb. The transmission areas 32 located adjacent to the first pixels PX1 may be connected to one another, forming a common transmission area. In this case, since the area of the transmission area 32 is increased, transmittance of the first display portion 110A1 may be increased. In the embodiment of FIG. 5, the transmission areas 32 located adjacent to the three first pixels PX1, for example, the first red pixel Pr, the first green pixel Pg, and the first blue pixel Pb, are connected to one another, forming a single transmission area.

Figure 6:
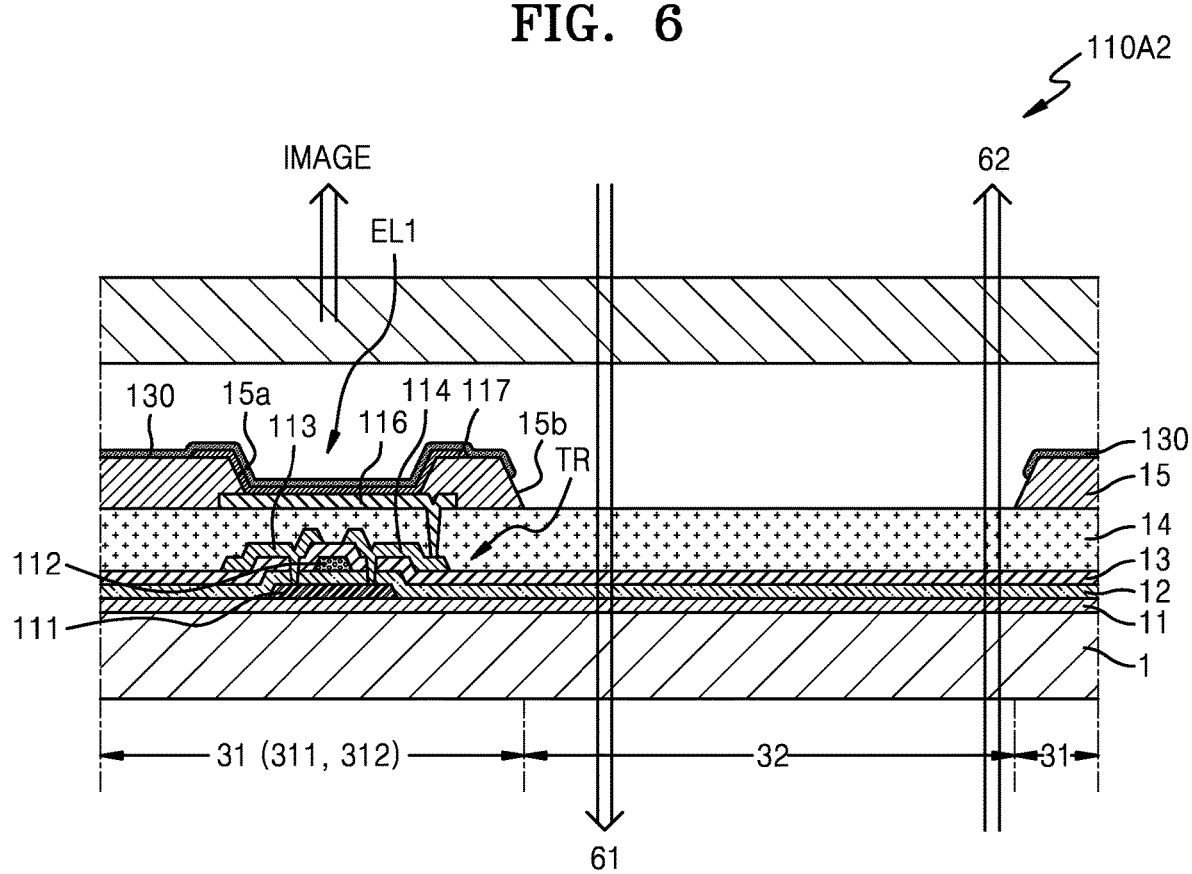
FIGS. 6 and 7 are respectively a cross-sectional view and a plan view illustrating an example of a first display portion according to another embodiment.
Figure 7:
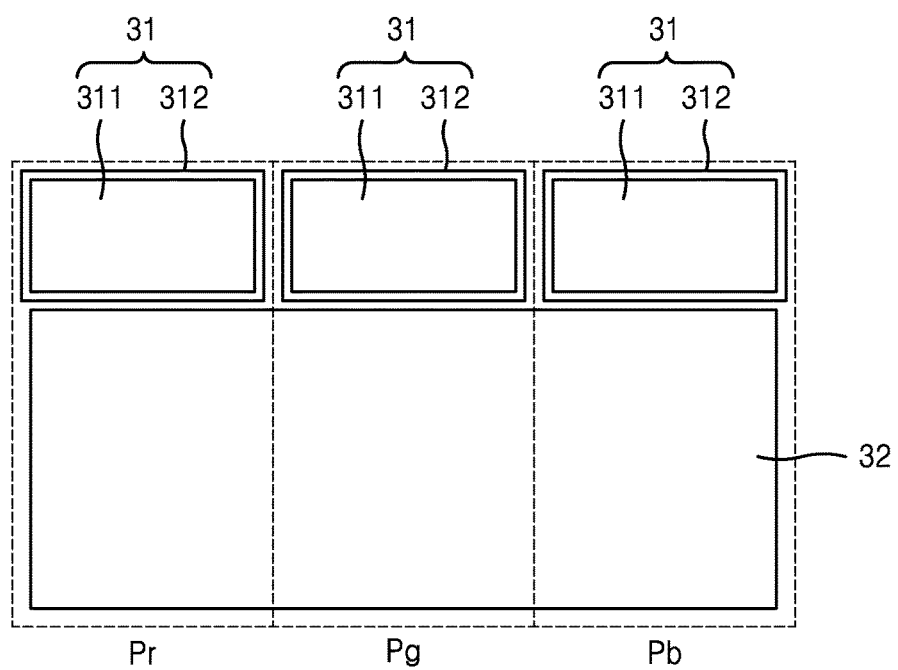

FIGS. 6 and 7 are, respectively, a cross-sectional view and a plan view illustrating an example of a first display portion 110A2 according to another embodiment.

Unlike the first display portion 110A1 illustrated in FIGS. 4 and 5, in the first display portion 110A2 illustrated in FIGS. 6 and 7, the circuit area 311 and the emission area 312, which are included in the pixel area 31, are overlapped with each other. The transmission areas 32 located adjacent to the first red pixel Pr, the first green pixel Pg, and the first blue pixel Pb may be connected to one another, forming a single common transmission area. In this case, compared to the embodiment of FIGS. 4 and 5, the area of the transmission area 32 may be further increased. The emission device EL1 may be of a top emission type. Since the respective elements are the same as or similar to those of the embodiment of FIGS. 4 and 5 in terms of function, detailed descriptions thereof are omitted.

When the first display portion 110A1 (or 110A2) is in the transparent mode in which light is transmitted, the transmittance control component 20A may be in the transparent state, and the first external light 61 and the second external light 62 may be transmitted through the transmission area 32 of the first display portion 110A1 (110A2). Accordingly, the first display portion 110A1 (110A2) is in the transparent state. Accordingly, the user located outside the first substrate 1 may observe an object located outside the second substrate 2 from the first external light 61, and the user located outside the second substrate 2 may observe an object located outside the first substrate 1 from the second external light 62.

When the first display portion 110A1 (110A2) is in a black mode in which no light is transmitted, the transmittance control component 20A is in the opaque state, and the first external light 61 and the second external light 62 may not be transmitted through the transmission area 32 of the first display portion 110A1 (110A2). Accordingly, the first display portion 110A1 (110A2) is in the opaque state. Accordingly, the user located outside the first substrate 1 may not observe an object located outside the second substrate 2, and the user located outside the second substrate 2 may not observe an object located outside the first substrate 1. Since the first display portion 110A1 (110A2) is in the opaque state, an image displayed on the first display portion 110A1 (110A2) may be excellent in producing a black color.

Figure 8:
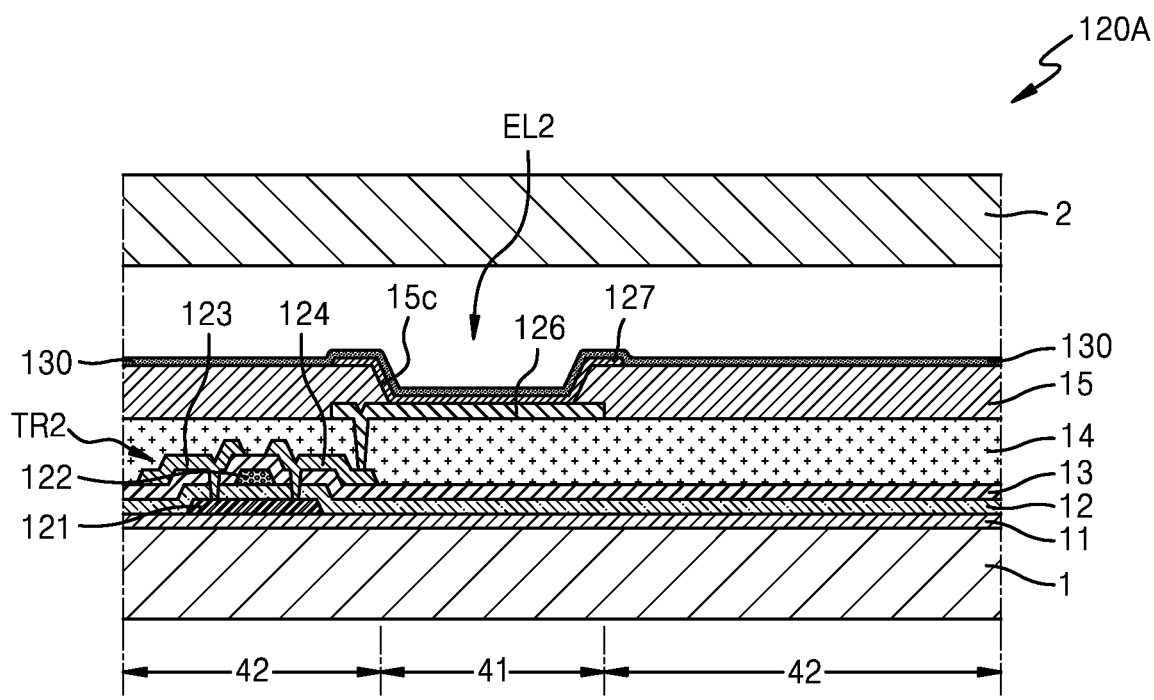
FIG. 8 is a cross-sectional view of an example of a second display portion according to an embodiment.

FIG. 8 is a cross-sectional view of an example of the second display portion 120A according to an embodiment.

Referring to FIG. 8, the second display portion 120A may include an emission area 41 and a non-emission area 42 around the emission area 41. Components and/or wirings may be arranged in the non-emission area 42, and no external light is transmitted through the non-emission area 42.

An emission device EL2 of the second pixel PX2 may be provided in the emission area 41. Accordingly, the emission area 41 may be defined to be an area corresponding to a first electrode 126 of the emission device EL2 or an emission layer.

A pixel circuit of the second pixel PX2 that is electrically connected to the emission device EL2 and includes a thin film transistor TR2 may be provided in the non-emission area 42. In another embodiment, a part of the pixel circuit is provided in the emission area 41, and thus the emission device EL2 and the part of the pixel circuit may be overlapped with each other. Although only one thin film transistor TR2 is illustrated, the present disclosure is not limited thereto, and the pixel circuit may further include a plurality of thin film transistors and capacitors, and also wirings such as scan lines, data lines, and power lines connected to the thin film transistors and capacitors.

The thin film transistor TR2 may include, on the buffer layer 11, a semiconductor layer 121, a gate electrode 122, a source electrode 123, and a drain electrode 124. The first insulating film 12 between the semiconductor layer 121 and the gate electrode 122 may function as a gate insulating film, and the second insulating film 13 between the gate electrode 122, and the source electrode 123 and the drain electrode 124 may function as an interlayer insulating film.

The emission device EL2 may include the first electrode 126 on the third insulating film 14 that covers the thin film transistor TR2, the second electrode 130 facing the first electrode 126, and an intermediate layer 127 between the first electrode 126 and the second electrode 130. An edge of the first electrode 126 may be covered by the fourth insulating film 15. The emission device EL2 may be of a top emission type or a bottom emission type. When the emission device EL2 and the pixel circuit are not overlapped with each other, the emission device EL2 may perform top emission or bottom emission. When at least a part of the pixel circuit is overlapped with the emission device EL2, the emission device EL2 may perform top emission.

The second pixel PX2 may be, for example, a second red pixel Pr, a second green pixel Pg, or a second blue pixel Pb.

FIGS. 9 to 16 are cross-sectional views illustrating a process of forming a first display portion and a second display portion, according to an embodiment.

Figure 9:
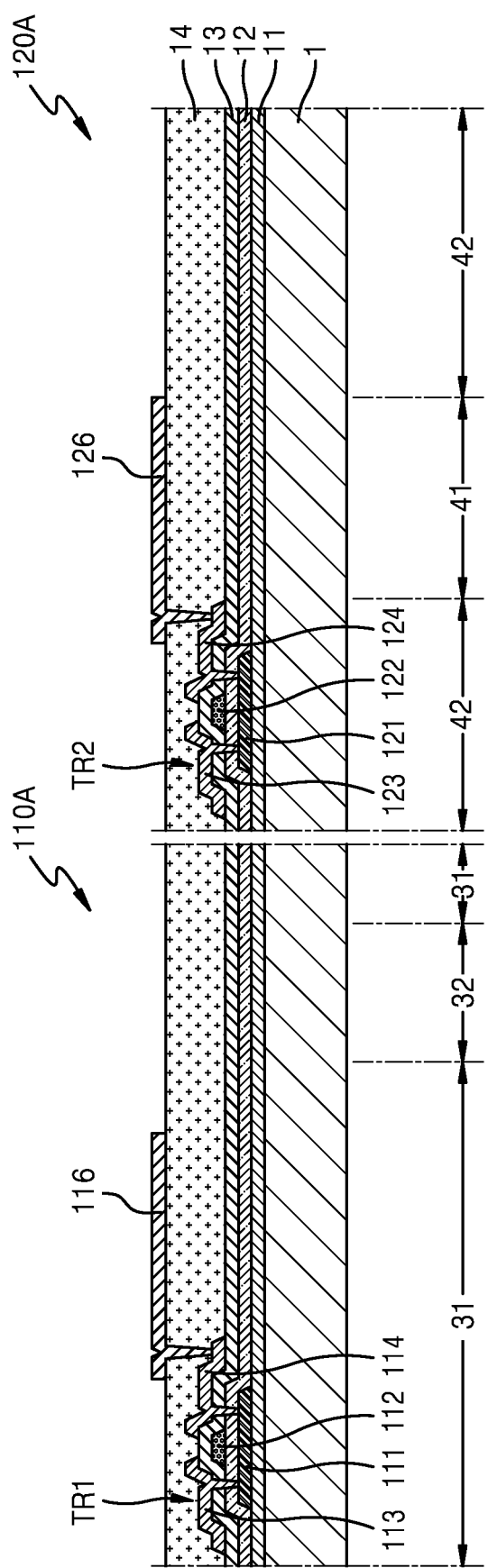
FIGS. 9, 10, 11, 12, 13, 14, 15, and 16 are cross-sectional views illustrating a process of forming a first display portion and a second display portion, according to an embodiment.

Referring to FIG. 9, the buffer layer 11 is formed on the first substrate 1, and the pixel circuits including the thin film transistor TR1 (TR2) is formed on the buffer layer 11.

The first substrate 1 may include a glass material, a ceramic material, a metal material, a plastic material, and/or a material having flexible or bendable characteristics.

The buffer layer 11 may be formed of an oxide film such as silicon oxide (SiOx) and/or a nitride film such as silicon nitride (SiNx). The buffer layer 11 may be omitted.

On the buffer layer 11, the semiconductor layer 111 of the first pixel PX1 is formed on the first display portion 110A and the semiconductor layer 121 of the second pixel PX2 is formed on the second display portion 120A. The semiconductor layers 111 and 121 may include various materials. For example, the semiconductor layers 111 and 121 may include an inorganic semiconductor material such as amorphous silicon and/or crystal silicon. In another example, the semiconductor layers 111 and 121 may include oxide semiconductor and/or an organic semiconductor material.

The first insulating film 12 may be formed on the buffer layer 11, covering the semiconductor layers 111 and 121, and the gate electrode 112 of the first pixel PX1 and the gate electrode 122 of the second pixel PX2 may be formed on the first insulating film 12.

The first insulating film 12 may be an inorganic insulating film. The first insulating film 12 may be formed of at least one material selected from $SiO_2$, SiNx, SiON, $Al_2O_3$, $TiO_2$, $Ta_2O_5$, $HfO_2$, $ZrO_2$, BST, and PZT in a single layer or a multilayer.

The gate electrodes 112 and 122 may be formed of various conductive materials, for example, at least one material of aluminum (Al), platinum (Pt), palladium (Pd), silver (Ag), magnesium (Mg), gold (Au), nickel (Ni), neodymium (Nd), iridium (Ir) chromium (Cr), lithium (Li), calcium (Ca), molybdenum (Mo), titanium (Ti), tungsten (W), and copper (Cu) in a single layer or a multilayer.

The second insulating film 13 is formed on the first insulating film 12, covering the gate electrodes 112 and 122, and the source electrode 113 and the drain electrode 114 of the first pixel PX1, and the source electrode 123 and the drain electrode 124 of the second pixel PX2, are formed on the second insulating film 13 to contact the semiconductor layers 111 and 121, respectively, via contact holes.

The second insulating film 13 may be an inorganic insulating film. The second insulating film 13 may be formed of at least one material selected from $SiO_2$, SiNx, SiON, $Al_2O_3$, $TiO_2$, $Ta_2O_5$, $HfO_2$, $ZrO_2$, BST, and PZT in a single layer or a multilayer. In another embodiment, the second insulating film 13 may be an organic insulating film.

The source electrodes 113 and 123 and the drain electrodes 114 and 124 may be formed of various conductive materials, for example, at least one material of aluminum (Al), platinum (Pt), palladium (Pd), silver (Ag), magnesium (Mg), gold (Au), nickel (Ni), neodymium (Nd), iridium (Ir), chromium (Cr), lithium (Li), calcium (Ca), molybdenum (Mo), titanium (Ti), tungsten (W), and copper (Cu) in a single layer or a multilayer.

The structures of the thin film transistors TR1 and TR2 are not limited to the above description, and various structures of a thin film transistor may be employed therefor. Furthermore, the structure of the thin film transistor TR1 of the first pixel PX1 and the structure of the thin film transistor TR2 of the second pixel PX2 may be the same as or different from each other.

The third insulating film 14 is formed covering the thin film transistor TR1 of the first pixel PX1 and the thin film transistor TR2 of the second pixel PX2.

The third insulating film 14 may be formed of an organic insulating film in a single layer or a multilayer with a flat upper surface. The third insulating film 14 may include a general purpose polymer (PMMA, PS), a polymer derivative having a phenol group, an acrylic based polymer, an imide based polymer, an aryl ether based polymer, an amide based polymer, a fluorine based polymer, a p-xylene based polymer, a vinyl alcohol based polymer, or a blend thereof. For example, the third insulating film 14 may include polyimide, polyamide, and/or acryl resin.

The first electrode 116 of the emission device EL1 electrically connected to the thin film transistor TR1 of the first pixel PX1 and the first electrode 126 of the emission device EL2 electrically connected to the thin film transistor TR2 of the second pixel PX2 may be formed on the third insulating film 14.

When the emission devices EL1 and EL2 are top emission devices, the first electrodes 116 and 126 may be formed as reflective electrodes. The reflective electrode may include a reflection layer including Ag, Mg, Al, Pt, Pd, Au, Ni, Nd, Ir, Cr, or a compound thereof, and a transparent or semi-transparent electrode layer formed on the reflection layer. When the emission devices EL1 and EL2 are bottom emission devices, the first electrodes 116 and 126 may include a transparent material such as ITO, IZO, ZnO, or $In_2O_3$, as a transparent or semi-transparent electrode.

As illustrated in FIG. 9, the buffer layer 11, the first insulating film 12, the second insulating film 13, and the third insulating film 14 may be formed covering all of the pixel area 31 and the transmission area 32 of the first display portion 110A. However, the present disclosure is not limited thereto, and at least one of the buffer layer 11, the first insulating film 12, the second insulating film 13, and the third insulating film 14 may have an opening (not shown) at a position corresponding to the transmission area 32, thereby further increasing external light transmission efficiency of the transmission area 32.

Figure 10:
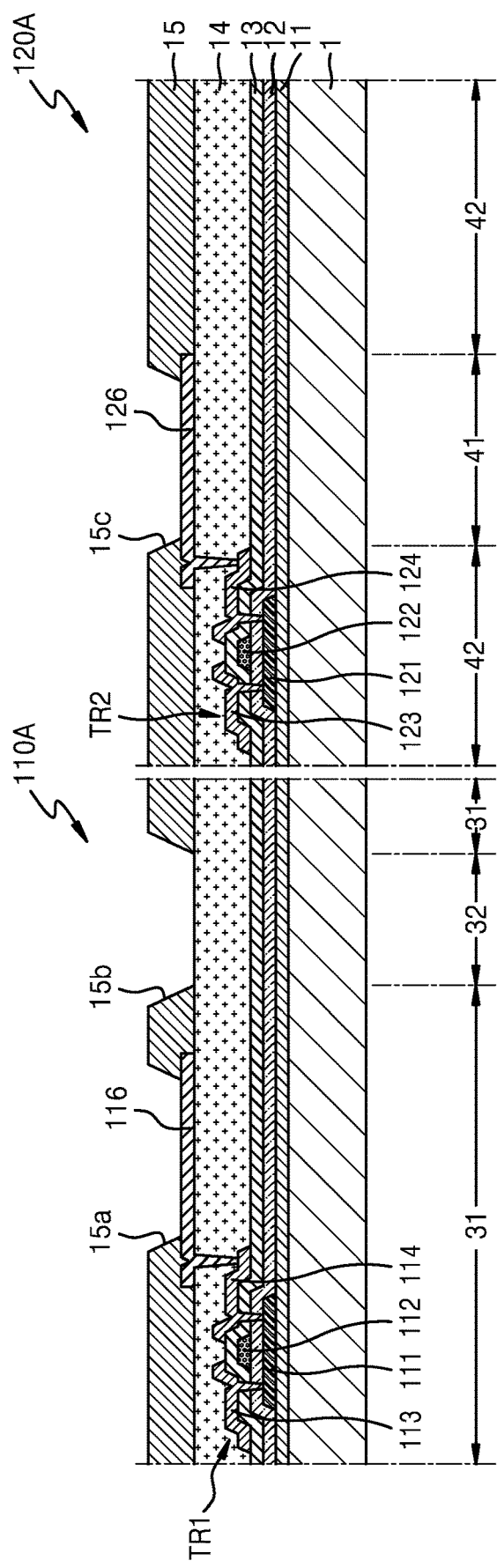

Referring to FIG. 10, the fourth insulating film 15 may be formed on the third insulating film 14, covering the edges of the first electrodes 116 and 126. The fourth insulating film 15 may be formed as the above-described inorganic insulating film or organic insulating film in a single layer or a multi-layer.

The fourth insulating film 15 may cover the pixel area 31 of the first display portion 110A, but not necessarily covering the whole of the pixel area 31. It is sufficient that the fourth insulating film 15 covers at least a part of the pixel area 31, particularly, the edge of the first electrode 116 of the first pixel PX1.

The fourth insulating film 15 may include a first opening 15a exposing at least a part of the first electrode 116 of the first pixel PX1, a second opening 15b at a position corresponding to the transmission area 32, and a third opening 15c exposing at least a part of the first electrode 126 of the second pixel PX2. Since the fourth insulating film 15 is not located in the transmission area 32, the external light transmission efficiency of the transmission area 32 may be further increased.

Figure 11:
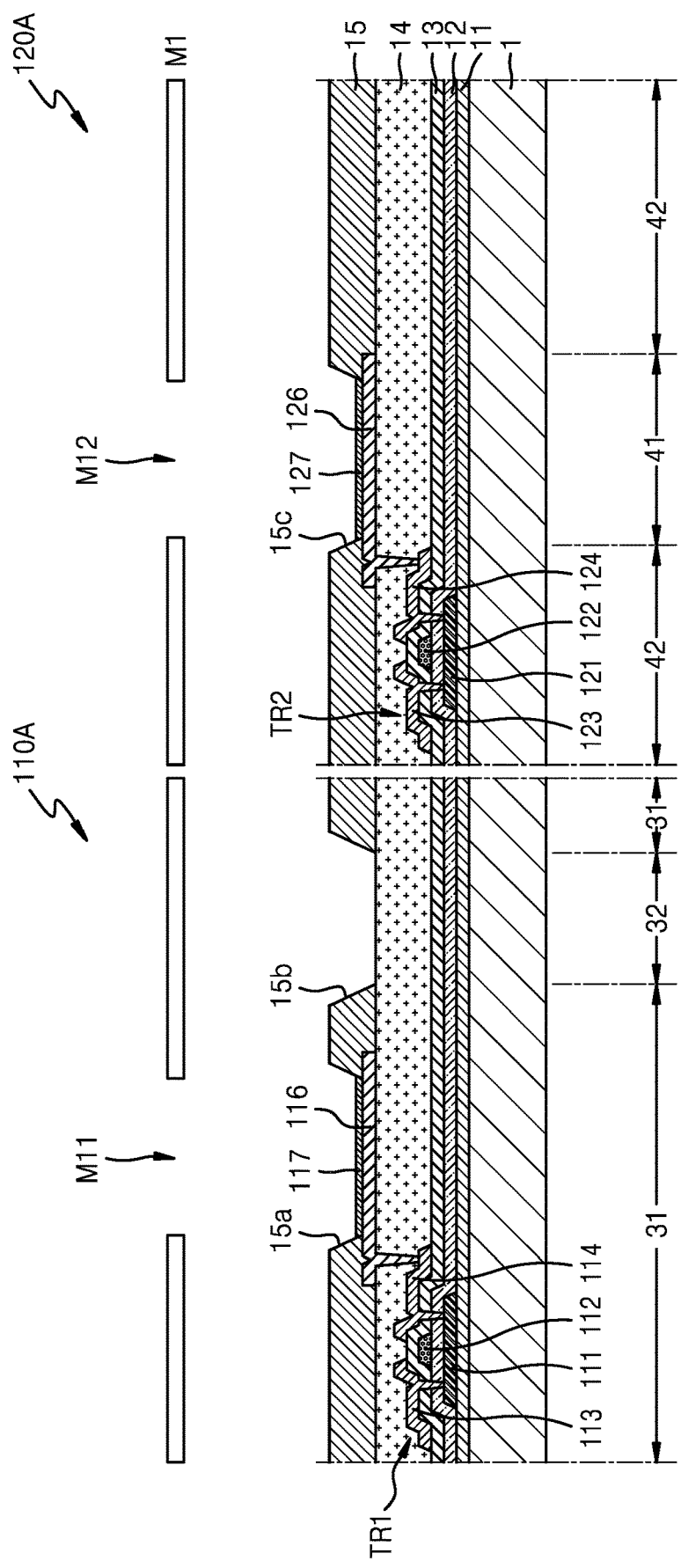

Referring to FIG. 11, the intermediate layer 117 may be formed on the first electrode 116 that is exposed through the first opening 15a of the first pixel PX1, and the intermediate layer 127 may be formed on the first electrode 126 that is exposed through the third opening 15c of the second pixel PX2.

The intermediate layers 117 and 127 may include an emission layer for emitting light, and further include at least one of functional layers including a hole injection layer (HIL), a hole transport layer (HTL), an electron transport layer (ETL), and an electron injection layer (EIL). However, the present disclosure is not limited thereto, and various functional layers may be further provided on the first electrodes 116 and 126.

The emission layer may be a red emission layer, a green emission layer, or a blue emission layer. Alternatively, the emission layer may have a multilayer structure in which a red emission layer, a green emission layer, and a blue emission layer are stacked, to emit white light, or a single layer structure including a red emission material, a green emission material, and a blue emission material.

In an embodiment, the intermediate layers 117 and 127 may be formed only in the emission areas 312 (FIGS. 4 and 6) and 41 by using a mask M1, for example, a fine metal mask (FMM), including an opening portion M11 corresponding to the emission area 312 of the first display portion 110A and an opening portion M12 corresponding to the emission area 41 of the second display portion 120A.

In another embodiment, the emission layers of the intermediate layers 117 and 127 may be formed only in the emission areas 312 and 41 by using a FMM having the opening portion M11 corresponding to the emission area 312 of the first display portion 110A and the opening portion M12 corresponding to the emission area 41 of the second display portion 120A, and other functional layers may be formed on an entire surface of the first substrate 1 by using an open mask.

In embodiments of the present disclosure, at least an emission layer is not formed in transmission area 32 of the first display portion 110A.

Figure 12:
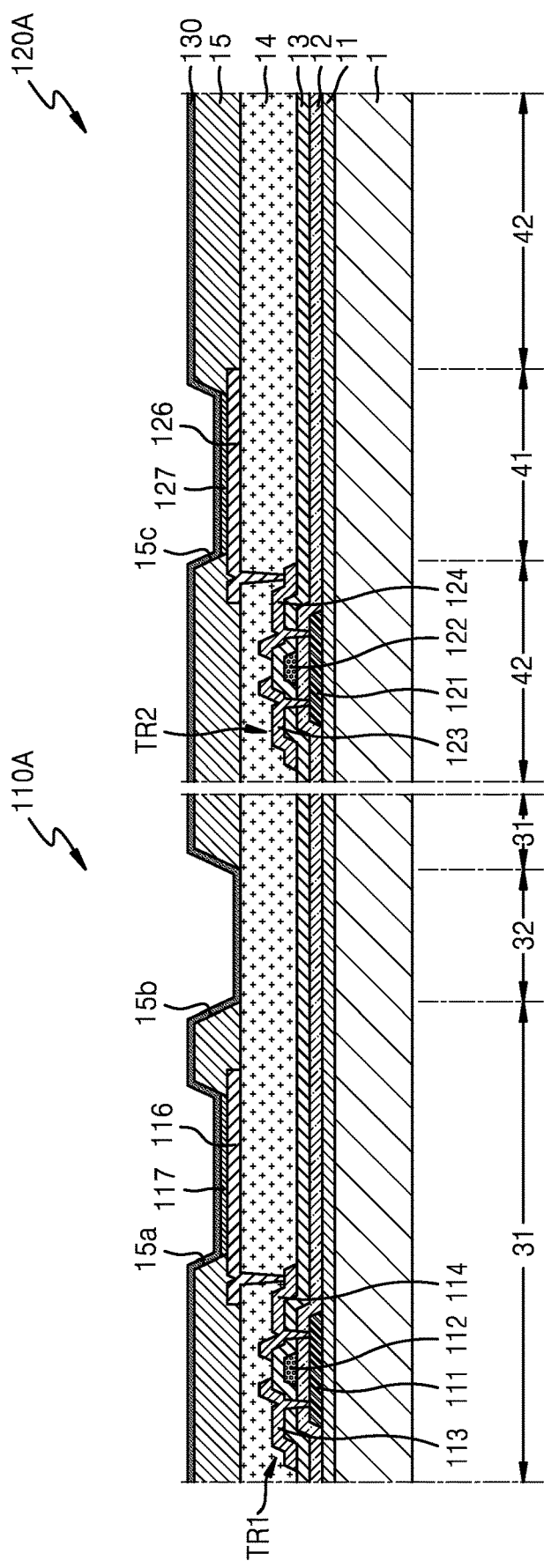

Referring to FIG. 12, in an embodiment, the second electrode 130 may be formed, as a common layer, on the intermediate layers 117 and 127 and the fourth insulating film 15 over the entire surface of the first substrate 1.

The second electrode 130 may be formed of Ag, Mg, Al, Pt, Pd, Au, Ni, Nd, Ir, Cr, Li, Ca, Mo, or a compound thereof. When the emission devices EL1 and EL2 are top emission devices, the second electrode 130 may be formed as a thin film having a thickness of about 100 Å to about 300 Å to increase transmittance.

Figure 15:
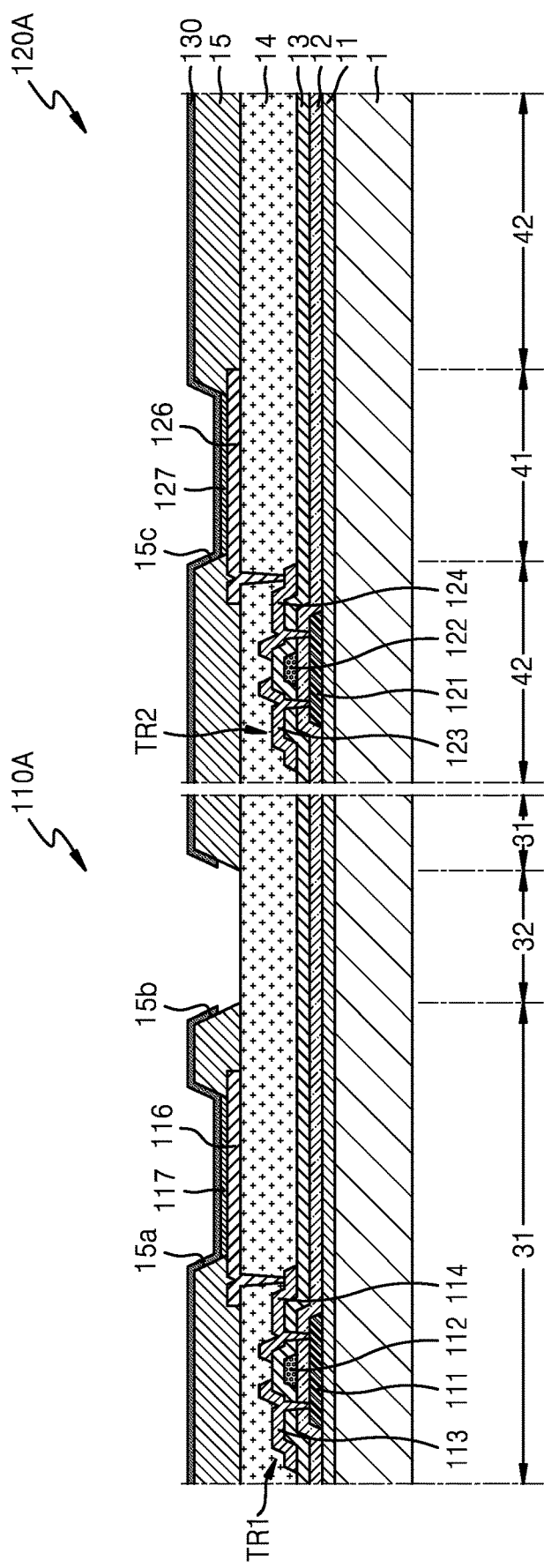

Next, as illustrated in FIG. 15, a part of the second electrode 130 formed in the second opening 15b may be removed. A method of removing the second electrode 130 is not particularly limited.

Figure 13:
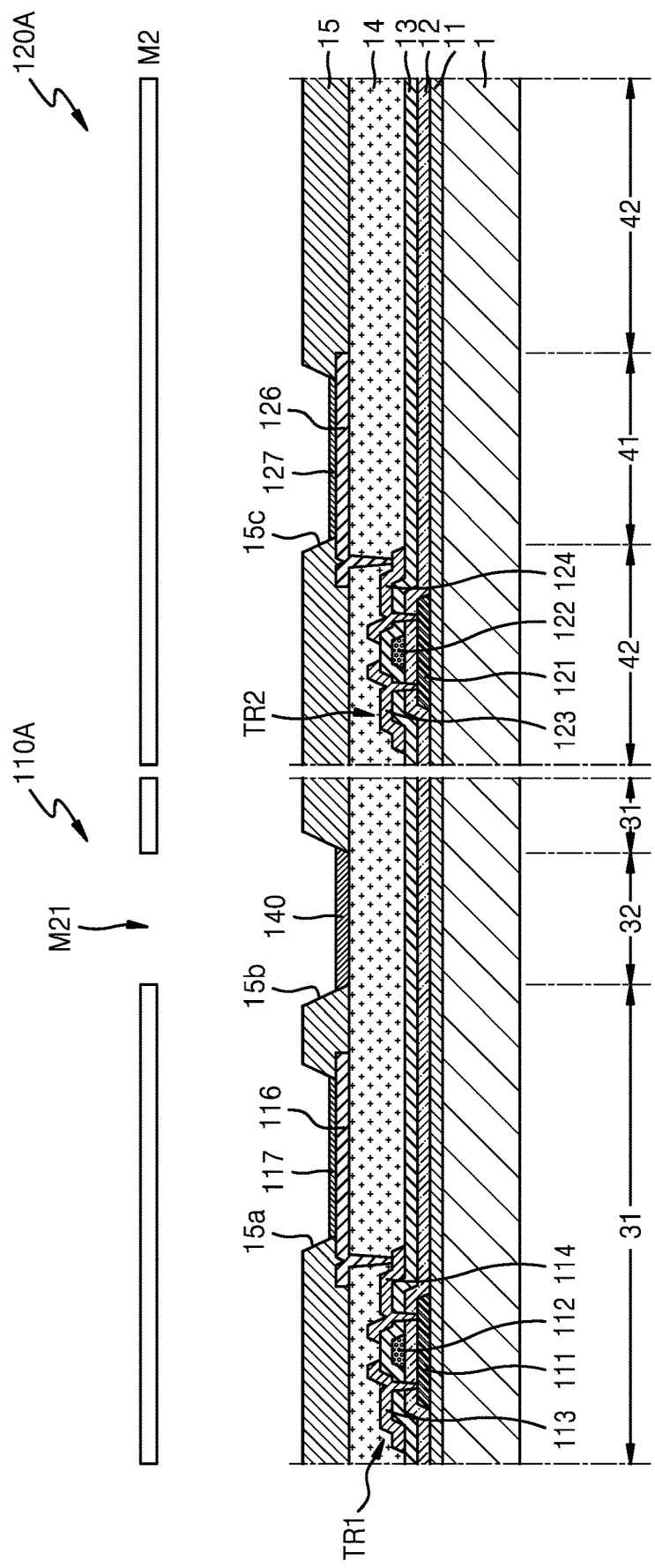

In another embodiment, after the process of FIG. 11 and unlike the process of FIG. 12, adhesive layer 140 is formed on the second opening 15b of the first display portion 110A as illustrated in FIG. 13. Then, as illustrated in FIG. 14, the second electrode 130 may be formed, as a common layer, on the intermediate layers 117 and 127, the adhesive layer 140, and the fourth insulating film 15 over the entire surface of the first substrate 1.

Referring to FIG. 13, the adhesive layer 140 may be formed on the second opening 15b of the first display portion 110A by using an FMM M2 having an opening portion M21 corresponding to the transmission area 32 of the first display portion 110A. The adhesive layer 140 may include a material having weak adhesiveness with respect to a lower insulating film that the adhesive layer 140 directly contacts.

Figure 14:
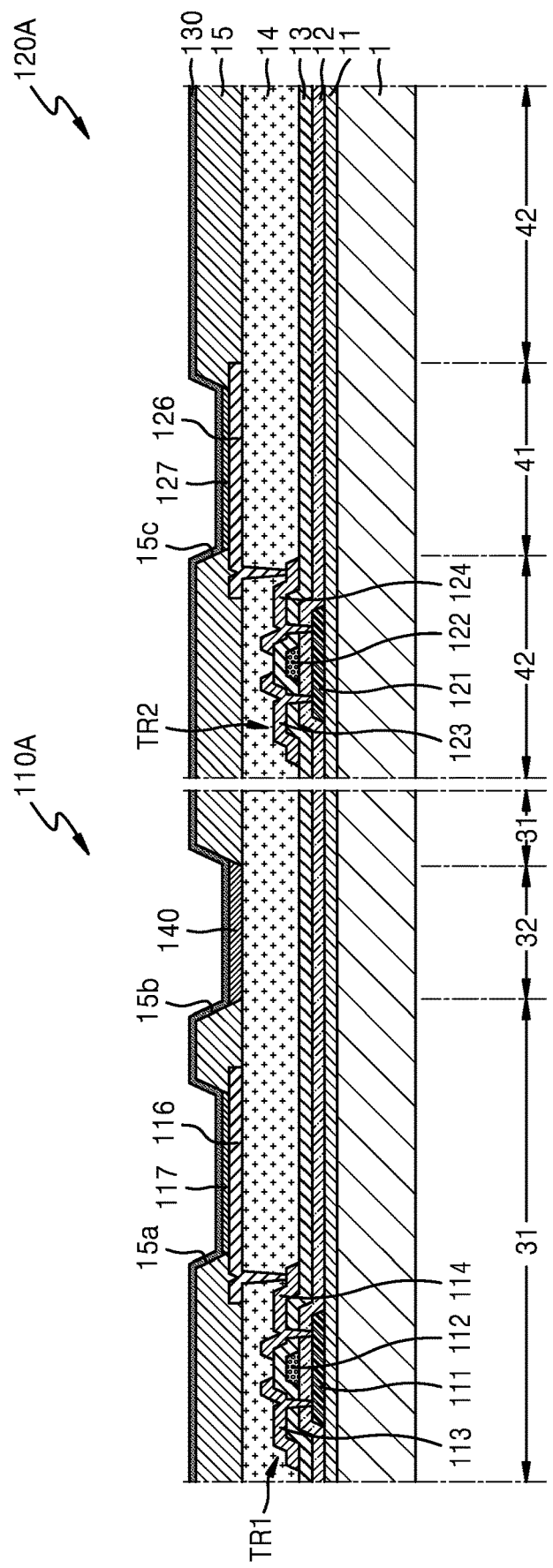

Referring to FIG. 14, the second electrode 130 may be formed, as a common layer, over the entire surface of the first substrate 1 on which the adhesive layer 140 is formed in the second opening 15b.

Next, as illustrated in FIG. 15, as the adhesive layer 140 formed in the second opening 15b is removed, a part of the second electrode 130 adhering to the adhesive layer 140 may be removed.

Figure 16:
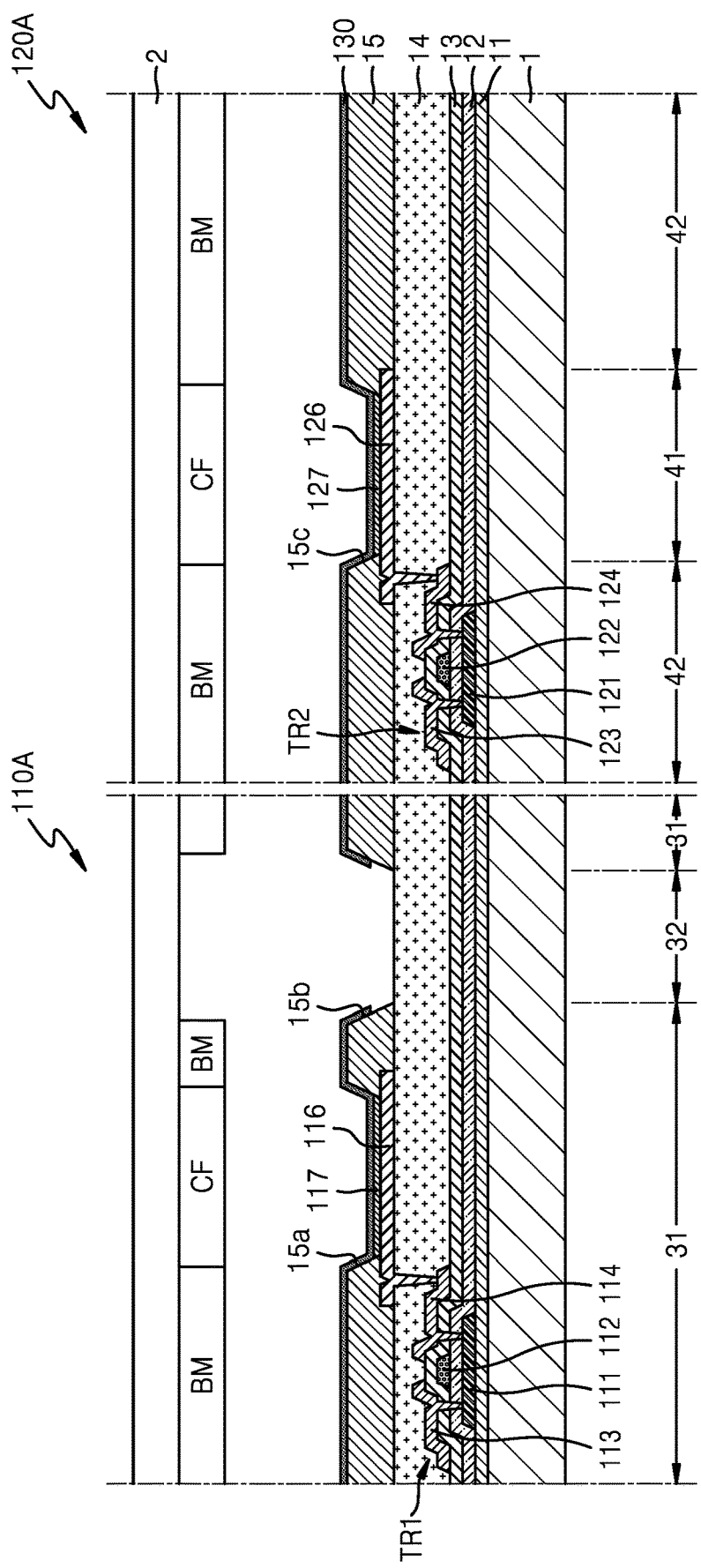

Referring to FIG. 16, after aligning the second substrate 2 above the first substrate 1, the first substrate 1 and the second substrate 2 may be coupled to each other.

The second substrate 2 may include a glass material, a ceramic material, a metal material, a plastic material, and/or a material having flexible or bendable characteristics.

A black matrix (BM) and a color filter (CF) may be provided on a surface of the second substrate 2 facing the first substrate 1. The color filter (CF) may be provided corresponding to the emission area 312 of the first display portion 110A and the emission area 41 of the second display portion 120A. The black matrix (BM) may be provided corresponding to an area of the first display portion 110A, but may be provided to not correspond to the emission area 312 and the transmission area 32, and to the non-emission area 42 of the second display portion 120A. In other words, the black matrix (BM) is not arranged in the emission area 312 and transmission area 32 of the first display portion 110A.

Although not illustrated, before coupling the second substrate 2 to the first substrate 1, a protective layer may be further provided above the second electrode 130. The protective layer may be a single layer or a multilayer of an inorganic film and/or an organic film.

Furthermore, although not illustrated, various other functional layers may be further provided above the second substrate 2. For example, the functional layers may include an anti-reflection layer that reduces reflection on the upper surface of the second substrate 2 or an anti-contamination layer that prevents contamination such as a finger mark, for example, a fingerprint, of the user.

In another embodiment, instead of the second substrate 2, a thin film encapsulation layer may be arranged above the first substrate 1. The thin film encapsulation layer may include an inorganic encapsulation layer having at least one inorganic material and an organic encapsulation layer having at least one organic material. In some embodiments, the thin film encapsulation layer may be provided in a structure in which a first inorganic encapsulation layer/an organic encapsulation layer/a second inorganic encapsulation layer are stacked.

Figure 17:
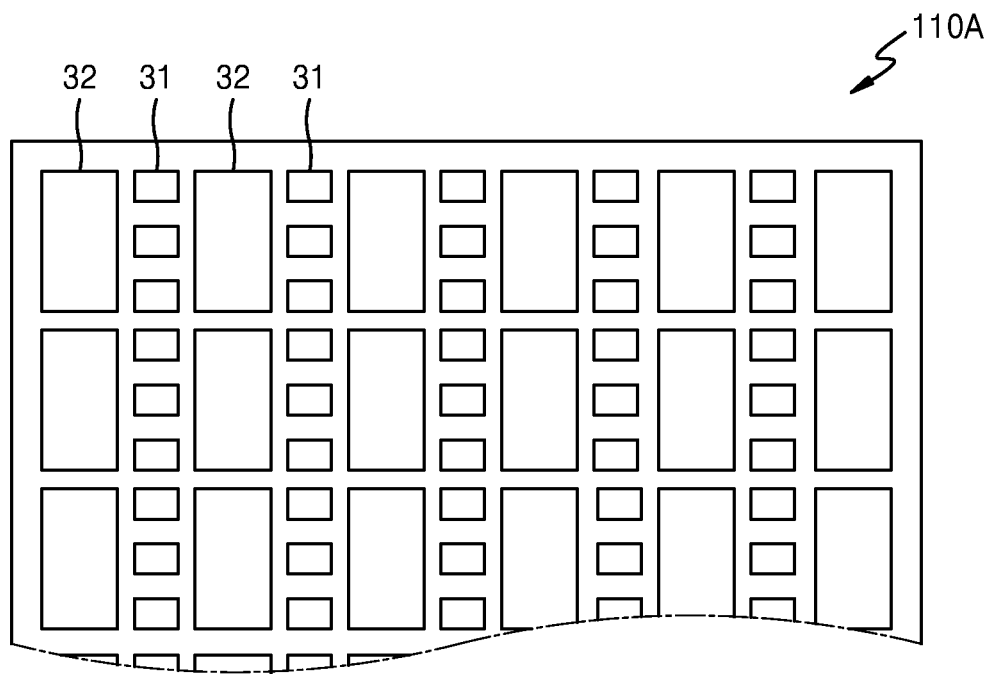
FIG. 17 is a schematic plan view of a first display portion according to an embodiment.

FIG. 17 is a schematic plan view of the first display portion 110A according to an embodiment.

Referring to FIG. 17, in the first display portion 110A, the first pixel PX1 may be arranged such that the pixel area 31 and the transmission area 32 are alternately repeated in one direction in a pattern. Accordingly, in the first display portion 110A, the pixel area 31 and the transmission area 32 may be formed regularly at a certain interval in one direction. The emission device EL1 and the pixel circuit of the first pixel PX1 may be provided in the pixel area 31.

Figure 18:
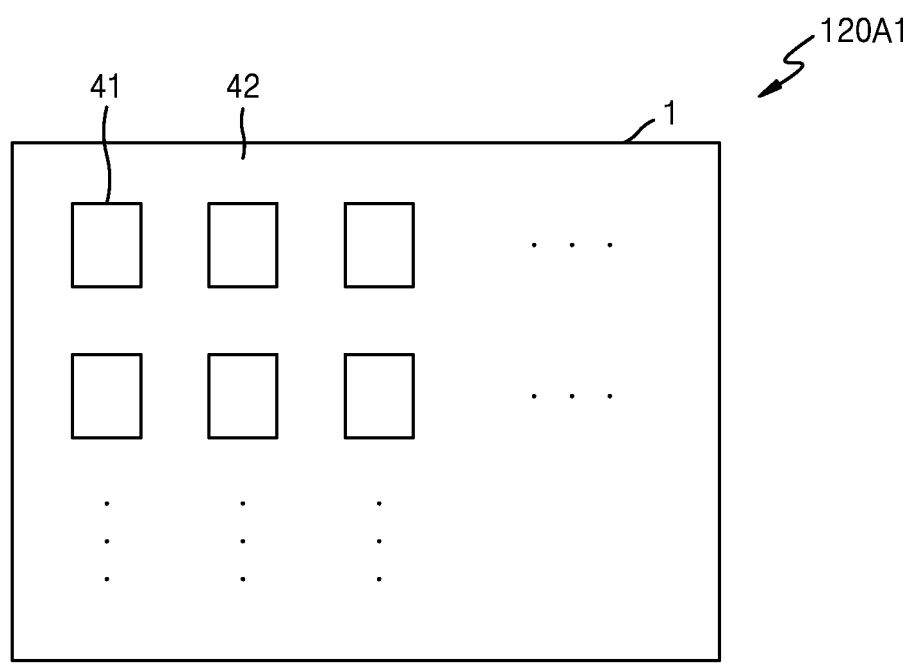
FIGS. 18 and 19 are schematic plan views of a second display portion according to an embodiment.
Figure 19:
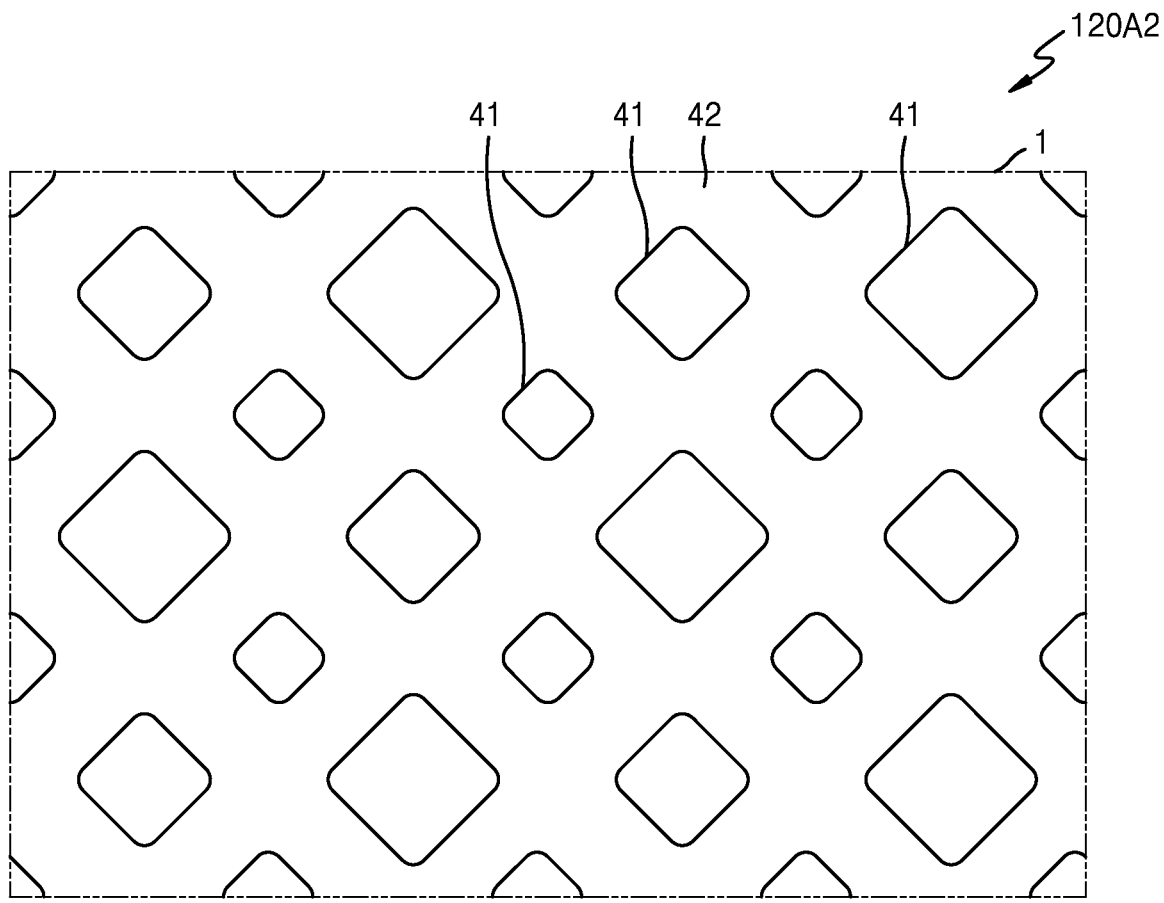

FIGS. 18 and 19 are schematic plan views of second display portions 120A1 and 120A2 according to an embodiment.

Referring to FIGS. 18 and 19, in the second display portions 120A1 and 120A2, the second pixel PX2 may be arranged such that the emission area 41 is repeated in the row and column directions in a certain pattern. The emission device EL2 of the second pixel PX2 may be provided in the emission area 41 of the second display portions 120A1 and 120A2, and the pixel circuit of the second pixel PX2 may be provided in the non-emission area 42 around the emission area 41, or at least a part of the pixel circuit of the second pixel PX2 may be provided in the emission area 41. The area of the emission area 41 may vary according to the color produced by the second pixel PX2.

In the embodiments of FIGS. 18 and 19, although the emission area 41 is illustrated to be rectangular with rounded vertexes, the present disclosure is not limited thereto, and the emission area 41 may have various shapes such as a polygon, a circle, an oval, or a triangle. A polygon may include a shape in which vertexes are rounded.

Figure 20A:
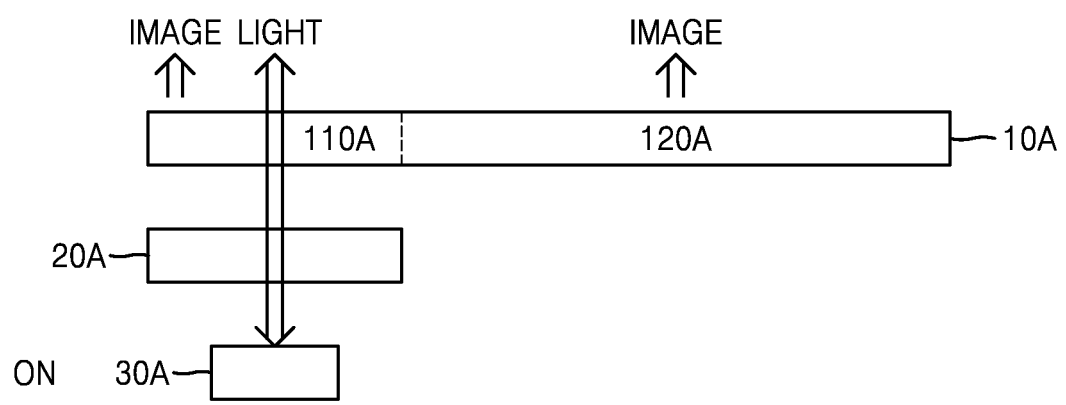
FIGS. 20A, 20B, and 20C are schematic diagrams illustrating an operation of the display apparatus of FIG. 1, according to an embodiment.
Figure 20B:
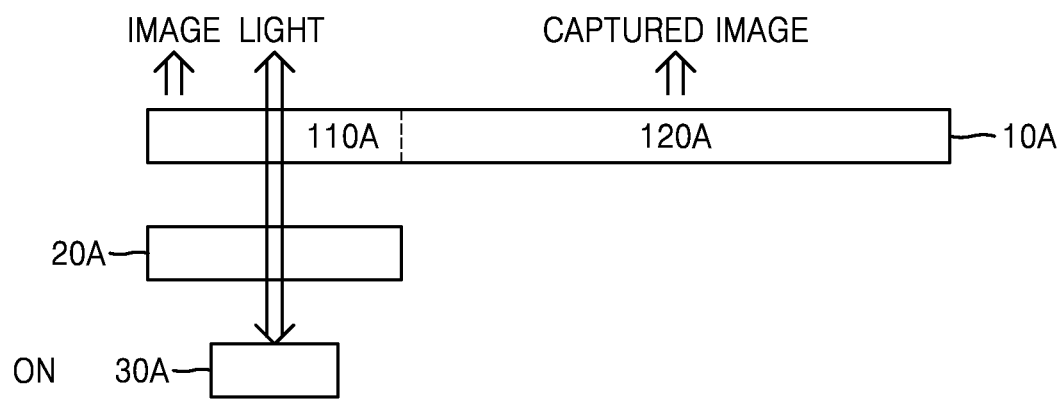
Figure 20C:
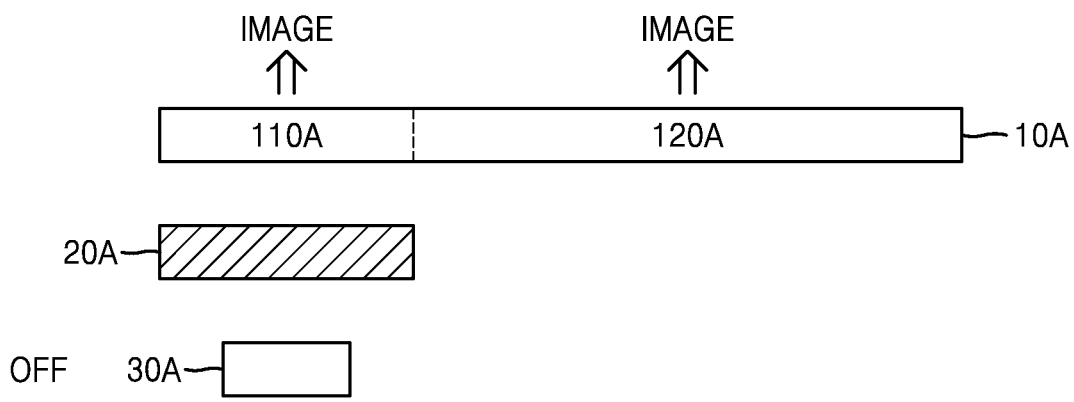

FIGS. 20A to 20C are schematic diagrams illustrating an operation of the display apparatus 100A of FIG. 1, according to an embodiment.

Referring to FIG. 20A, when the electronic component 30A is activated (ON) to perform a function according to the type of electronic component 30A as described below, the transmittance of the transmittance control component 20A may be controlled to transmit external light, and the first display portion 110A may be set to be in the transparent mode in which the external light is transmitted. The electronic component 30A may perform the function based on the presence and/or intensity of light transmitting through the transmission area 32 of the first display portion 110A.

The electronic component 30A may be selectively activated according to a user's activation request such as a user's execution of a related application. Alternatively, when an event assigned to the activation of the electronic component 30A occurs, as described further below according to the type of the electronic component 30A, the activation of the electronic component 30A may be automatically performed.

When the electronic component 30A is a light source, the controller 40A, in response to an input of a turn-on signal of the light source by a user, may control the transmittance of the transmittance control component 20A to transmit external light, set the first display portion 110A to be in the transparent mode in which the external light is transmitted, and turn on the light source. In this case, the first display portion 110A and the second display portion 120A may each continuously display an image. Since the first display portion 110A is in the transparent state, the user may observe an external object through a portion of the first display portion 110A in which the electronic component 30A is not provided.

When the electronic component 30A is a state indicator which shows an on/off state of a device, the controller 40A, when detecting a preset state of the display apparatus 100A, may control the transmittance of the transmittance control component 20A to transmit external light, set the first display portion 110A to be in the transparent mode in which the external light is transmitted, and turn on the light source. The light source may emit color corresponding to the detected state of the display apparatus 100A. In this case, the first display portion 110A and the second display portion 120A may continuously display an image. Since the first display portion 110A is in the transparent mode, the user may observe an external object through a portion of the first display portion 110A in which the electronic component 30A is not provided.

When the electronic component 30A is an optical sensor, the controller 40A may control the transmittance of the transmittance control component 20A to transmit the external light, and the first display portion 110A may be set to be in the transparent mode in which the external light is transmitted. The controller 40A may measure an amount of light incident on the optical sensor, and may increase or decrease brightness of the first display portion 110A and/or the second display portion 120A according to a measured amount of light. In this case, the first display portion 110A and the second display portion 120A may continuously display an image. Since the first display portion 110A is in the transparent mode, the user may observe an external object through a portion of the first display portion 110A in which the electronic component 30A is not provided.

When the electronic component 30A is a proximity sensor using light, the proximity sensor may include a light source and an optical sensor. The light source and the optical sensor may be provided in adjacent transmission areas. The controller 40A may control the transmittance of the transmittance control component 20A to transmit the external light, and may set the first display portion 110A to be in the transparent mode in which the external light is transmitted. The controller 40A may measure an amount of light emitted from the light source, reflected by the external object, and incident on the optical sensor, and may determine the proximity of the object according to the measured amount of light. When proximity of the object is detected, the controller 40A may temporarily activate or deactivate a specific function. In this case, the first display portion 110A and the second display portion 120A may continuously display an image that is being displayed. Since the first display portion 110A is in the transparent mode, the user may observe the external object in a part of the first display portion 110A in which the electronic component 30A is not provided.

When the electronic component 30A is a touch sensor using light, the touch sensor may include a light source and an optical sensor. The light source and the optical sensor may be provided in adjacent transmission areas. The controller 40A may control the transmittance of the transmittance control component 20A to transmit the external light, and set the first display portion 110A to be in the transparent mode in which the external light is transmitted. The controller 40A may measure an amount of light emitted from the light source, reflected from the external object, for example, a finger, and incident on the optical sensor, and may determine a touch of the object and/or a touch position according to the measured amount of light. When a touch of the object is detected, the controller 40A may temporarily activate or deactivate a specific function corresponding thereto. In this case, the first display portion 110A and the second display portion 120A may continuously display an image. Since the first display portion 110A is in the transparent mode, the user may observe the external object in a part of the first display portion 110A in which the electronic component 30A is not provided.

When the electronic component 30A is an image sensor, the controller 40A may control the transmittance of the transmittance control component 20A to transmit the external light, and may set the first display portion 110A to be in the transparent mode in which the external light is transmitted. As illustrated in FIG. 20B, the controller 40A may generate a captured image corresponding to an optical signal incident on the image sensor to display the captured image on the first display portion 110A and/or the second display portion 120A. One of the first display portion 110A or the second display portion 120A, on which the captured image is not displayed, may continuously display an image.

Referring to FIG. 20C, when the function of the electronic component 30A is terminated to be inactive (OFF), the controller 40A may control the transmittance control component 20A to have a transmittance at which light is not transmitted, and the first display portion 110A to be in a black mode in which light is not transmitted. In this case, the first display portion 110A and the second display portion 120A each may continuously display an image.

Figure 21:
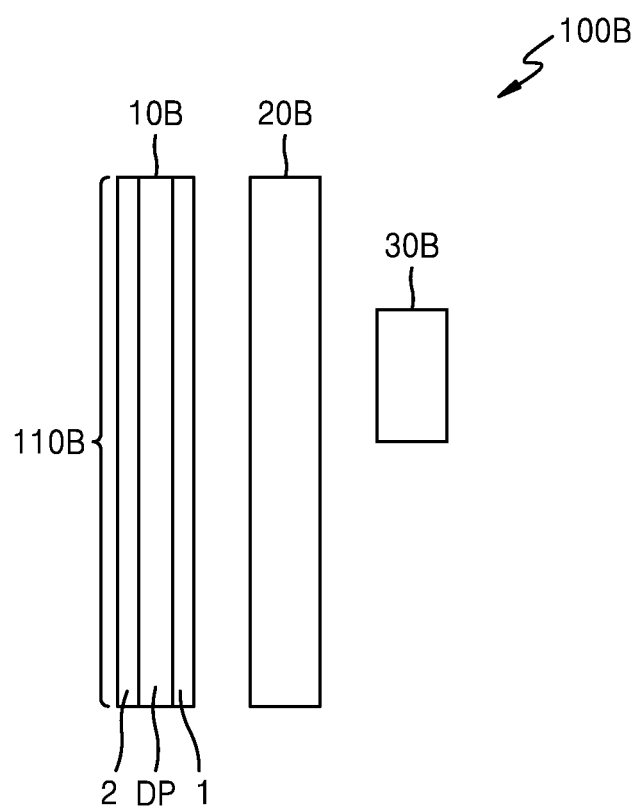
FIG. 21 is a schematic structural view of a display apparatus according to another embodiment.
Figure 22:
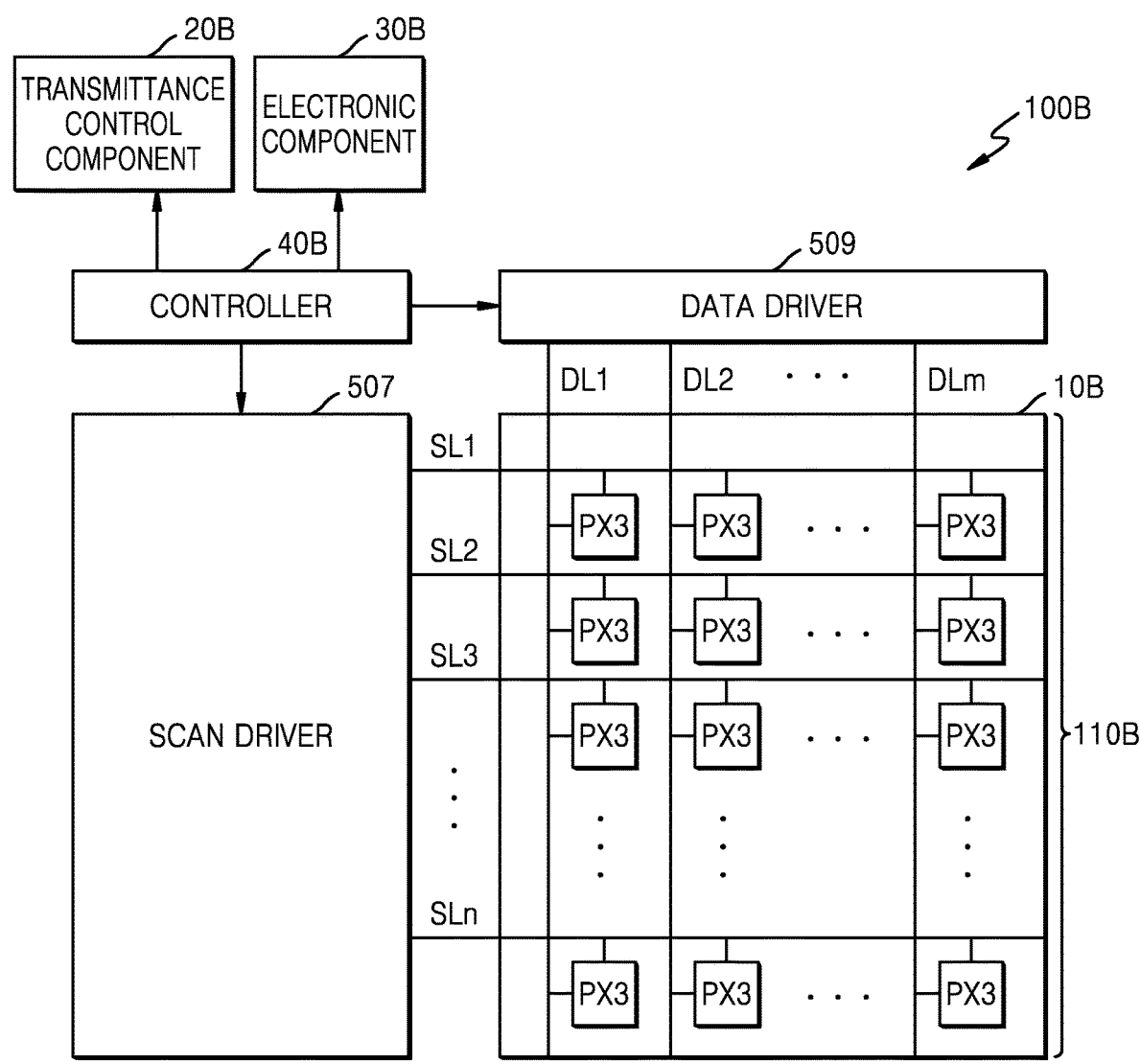
FIG. 22 is a schematic block diagram of the display apparatus of FIG. 21.

FIG. 21 is a schematic structural view of a display apparatus 100B according to another embodiment. FIG. 22 is a schematic block diagram of the display apparatus 100B of FIG. 21.

Referring to FIGS. 21 and 22, the display apparatus 100B according to the present embodiment may include a display panel 10B, a transmittance control component 20B, an electronic component 30B, a controller 40B, and a driver. The driver may include a scan driver 507 and a data driver 509.

The display panel 10B may include the first substrate 1, the display portion DP including a plurality of pixels provided on the first substrate 1, and the second substrate 2 hermetically sealing the display portion DP. Unlike the display apparatus 100A of the embodiment illustrated in FIGS. 1 to 3, the entire screen of the display apparatus 100B is implemented to be a transparent display portion. In other words, the whole of the display portion DP is implemented as a third display portion 110B forming one screen. The third display portion 110B may be a transparent display portion that is switchable between the transparent state and the opaque state.

In the third display portion 110B, the scan lines SL1 to SLn that receive scan signals from the scan driver 507 may extend in a row direction, and a plurality of data lines DL1 to DLm that receive data signals from the data driver 509 may extend in a column direction.

A plurality of third pixels PX3 may be arranged in the row and column directions in a certain pattern in the third display portion 110B. Each of the third pixels PX3 may be connected to one of the scan lines SL1 to SLn and one of the data lines DL1 to DLm.

The third display portion 110B and the third pixels PX3 may have the same or similar structures as the first display portion 110A and the first pixel PX1 illustrated in FIGS. 4 to 7 and FIG. 17. Accordingly, in the following description, a detailed description of the third pixels PX3 of the third display portion 110B is omitted.

The third display portion 110B may include the pixel area 31 and the transmission area 32 located adjacent to the pixel area 31 and transmitting light. The pixel area 31 may include the emission area 312 and the circuit area 311. The third pixels PX3 may be provided in the pixel area 31. An emission device of the third pixels PX3 may be provided in the emission area 312. A pixel circuit of the third pixels PX3 that are electrically connected to the emission device and including thin film transistors may be provided in the circuit area 311. The circuit area 311 and the emission area 312 of the third display portion 110B may not be overlapped with each other as illustrated in FIGS. 4 and 5, or may be overlapped with each other as illustrated in FIGS. 6 and 7.

The transmittance control component 20B may be provided at at least one side of a front surface and a rear surface of the display panel 10B. The transmittance control component 20B may include a material for controlling transmittance of light. The transmittance control component 20B may have an area corresponding to the entire surface of the third display portion 110B. The transmittance of the transmittance control component 20B may be controlled according to modes.

The electronic component 30B may be a device using light, such as, for example, an image sensor, an optical sensor, a light source, a proximity sensor, or a biosensor. However, the electronic component 30B is not limited to the above-described examples, and may instead be another type of component such as a speaker, a microphone, an antenna, a non-light based proximity sensor, or another type of component. The electronic component 30B may be provided to correspond to at least one transmission area 32 of the third display portion 110B. At least one electronic component may be provided as the electronic component 30B. The electronic component 30B may be provided at a certain position of the third display portion 110B.

The controller 40B may include a drive IC for driving the driver, the electronic component 30B, and the transmittance control component 20B. The controller 40B may output a control signal to control driving of the electronic component 30B, and process an input signal of the electronic component 30B to output an output signal to an output unit. The output unit may be the third display portion 110B or another electronic component 30B. The controller 40B may generate a control signal for driving of the transmittance control component 20B according to a driving state of the electronic component 30B, to control the transmittance of the transmittance control component 20B. The controller 40B may output an image signal and a control signal to the driver.

The scan driver 507 may generate scan signals to operate the third pixels PX3 according to a timing control signal of the controller 40B in a preset order, and output the generated scan signals to the scan lines SL1 to SLn.

The data driver 509 may convert image signals to data signals according to the timing control signal of the controller 40B, and output the converted data signals to the data lines DL1 to DLm.

The third display portion 110B and the third pixels PX3 are formed on the front surface of the first substrate 1, and since a formation process thereof is the same as the formation process of the first display portion 110A and the first pixel PX1 of FIGS. 9 to 16, a description thereof is omitted.

Figure 23A:
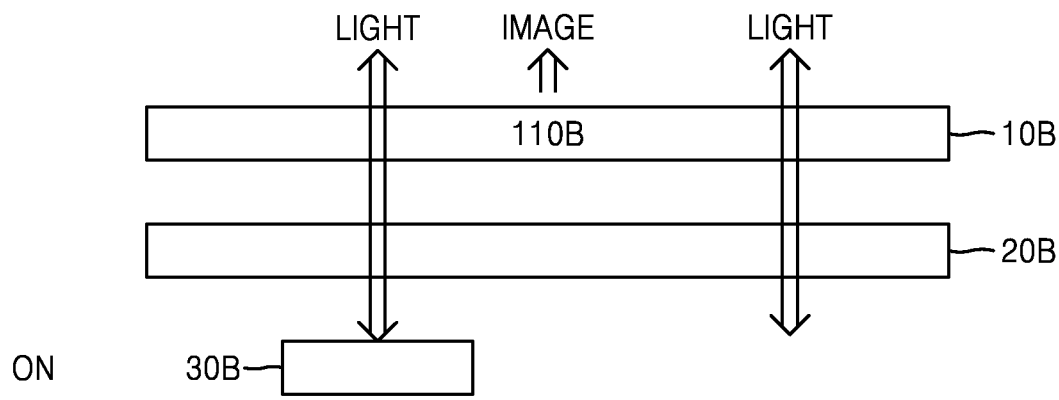
FIGS. 23A, 23B, and 23C are schematic diagrams illustrating an operation of the display apparatus of FIG. 21, according to an embodiment.
Figure 23B:
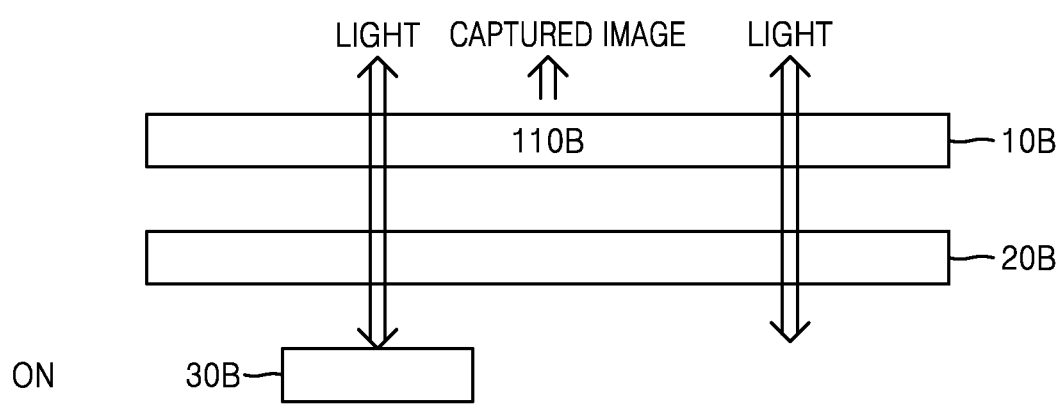
Figure 23C:
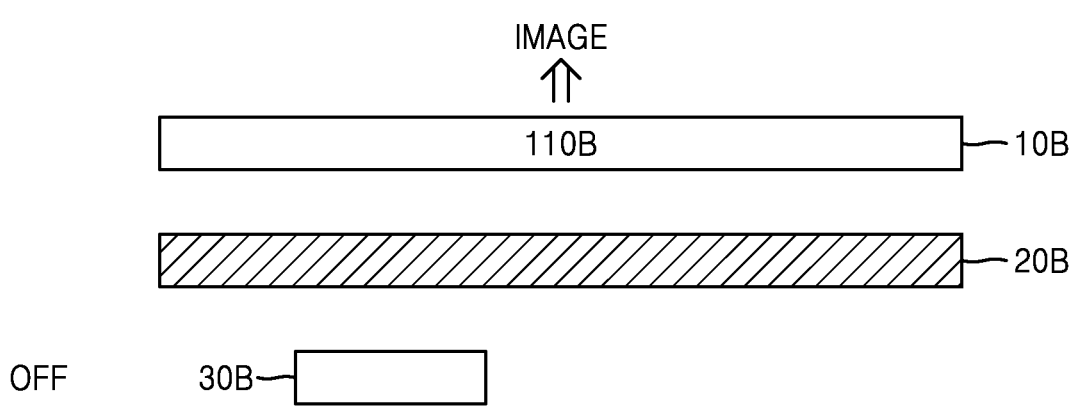
Figure 24A:
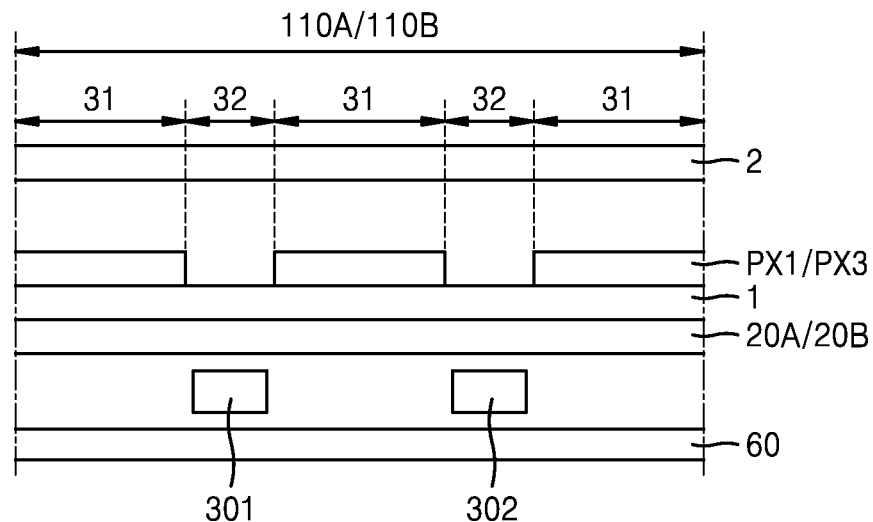
FIGS. 24A, 24B, 24C, and 24D are cross-sectional views illustrating an arrangement of electronic components, according to an embodiment.
Figure 24B:
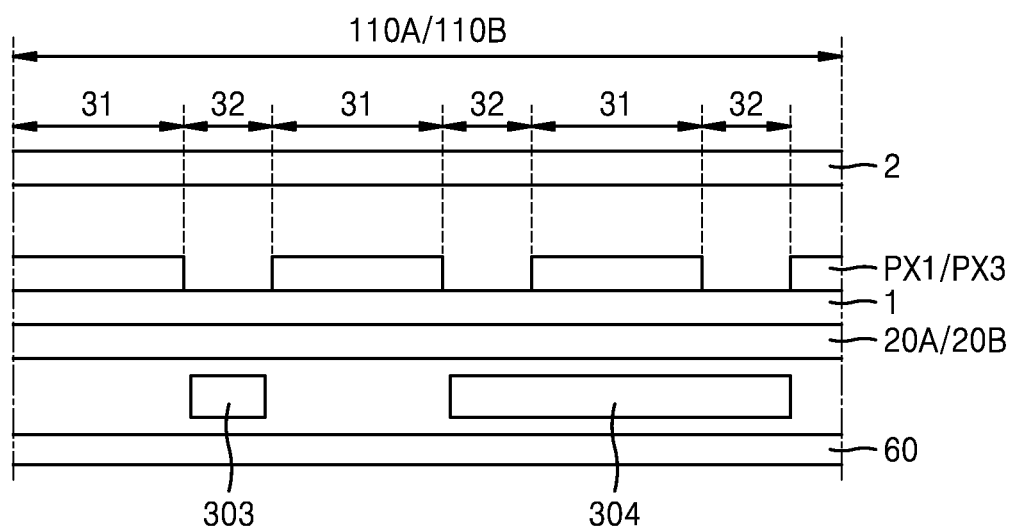
Figure 24C:
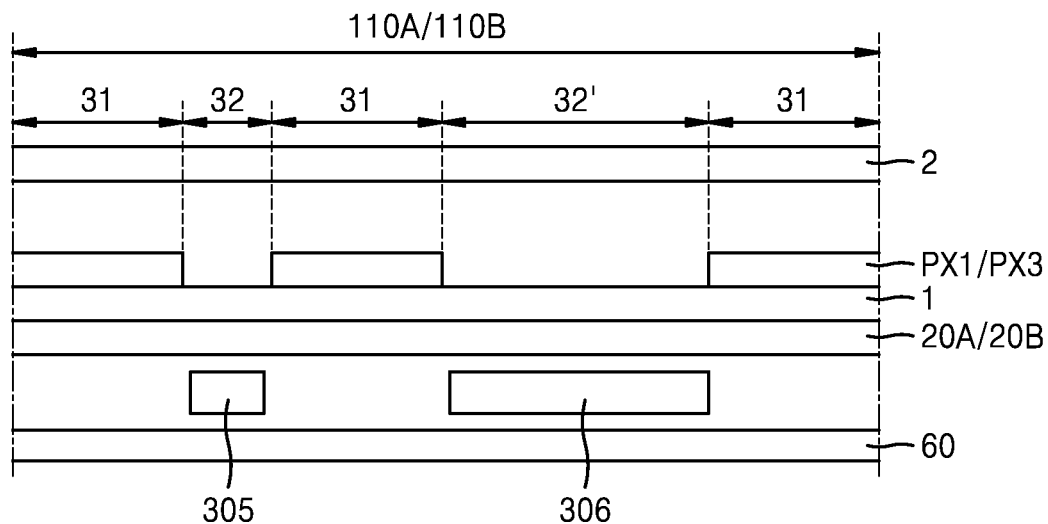
Figure 24D:
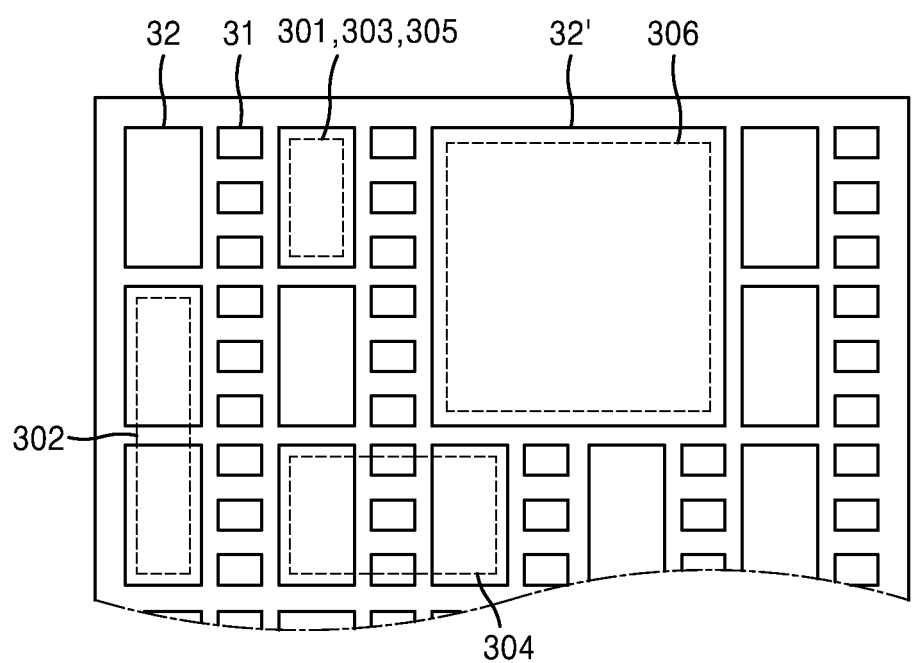

FIGS. 23A to 23C are schematic diagrams illustrating an operation of the display apparatus 100B of FIG. 21, according to an embodiment.

Referring to FIG. 23A, when the electronic component 30B is activated (ON) to perform a function, the transmittance of the transmittance control component 20B may be controlled to transmit external light, and the third display portion 110B may be set to be in the transparent mode in which the external light is transmitted. The electronic component 30B may perform a function by using the light that transmits through the transmission area 32 of the third display portion 110B.

The electronic component 30B may be selectively activated according to a user's activation request such as execution of a related application. Alternatively, when an event assigned to the activation of the electronic component 30B occurs, the activation of the electronic component 30B may be automatically performed.

As described above with reference to FIG. 20A, when the electronic component 30B, which may be a light source, a state indicator, an optical sensor, a proximity sensor using light, or a touch sensor using light, is activated (ON), the controller 40B may control the transmittance of the transmittance control component 20B to transmit light, and set the third display portion 110B to be in the transparent mode. In this case, the controller 40B may continuously display an image that is being displayed on the third display portion 110B while performing the function of the electronic component 30B. At the same time, since the third display portion 110B is in the transparent mode, the user may observe an external object through a portion of the third display portion 110B in which the electronic component 30B is not provided.

When the electronic component 30B is an image sensor, the controller 40B may control the transmittance of the transmittance control component 20B to transmit the external light, and may set the third display portion 110B to be in the transparent mode. As illustrated in FIG. 23B, the controller 40B may generate a captured image corresponding to an optical signal incident on the image sensor to display the captured image on the third display portion 110B. In this case, since the third display portion 110B is in the transparent mode, while the third display portion 110B displays the captured image, the user may observe an external object through a portion of the third display portion 110B in which the electronic component 30B is not provided.

Referring to FIG. 23C, when the function of the electronic component 30B is terminated to be inactive (OFF), the controller 40B may control the transmittance control component 20B to have a transmittance at which light is not transmitted, and the third display portion 110B to be in a black mode in which light is not transmitted. In this case, the third display portion 110B may continuously display an image.

FIGS. 24A to 24D are cross-sectional views illustrating an arrangement of electronic components, according to an embodiment.

Referring to FIGS. 24A to 24D, according to the configuration of electronic components, electronic components 301-306 may be arranged corresponding to an area including at least one transmission area 32 of the first display portion 110A or the third display portion 110B. The display panel 10A (10B), the transmittance control component 20A (20B), and the electronic component 30A (30B) may be coupled to a housing 60.

In an embodiment, each of electronic components 301, 303, and 305 may be arranged corresponding to respective transmission area 32 of the first display portion 110A or the third display portion 110B.

In another embodiment, an electronic component 302 may be arranged corresponding to an area including at least one transmission area 32 of the first display portion 110A or the third display portion 110B. The embodiment may be a case in which the electronic component 302 includes two or more components and/or the size of the electronic component 302 is large.

In another embodiment, an electronic component 304 may be arranged corresponding to an area including at least two transmission areas 32 and at least one pixel area 31 of the first display portion 110A or the third display portion 110B. The embodiment may be a case in which the electronic component 304 includes two or more components and/or the size of the electronic component 304 is large.

In another embodiment, a transmission area 32' having a area larger than a transmission area 32 may be separately provided in the first display portion 110A or the third display portion 110B, and an electronic component 306 may be provided corresponding to the transmission area 32'. The transmission area 32' may have an area smaller than or the same as the transmission area 32. The present embodiment may be a case in which the electronic component 304 includes two or more components or the size of the electronic component 304 is large.

Figure 25A:
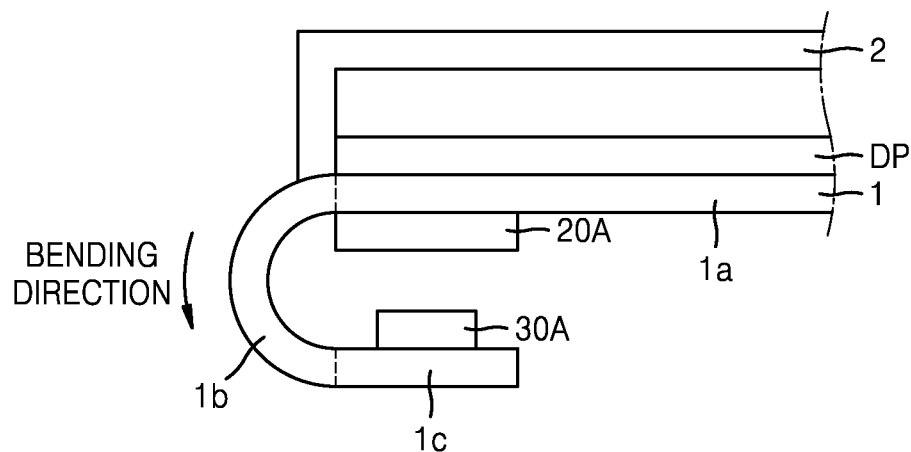
FIGS. 25A and 25B are cross-sectional views illustrating an arrangement of electronic components according to another embodiment.
Figure 25B:
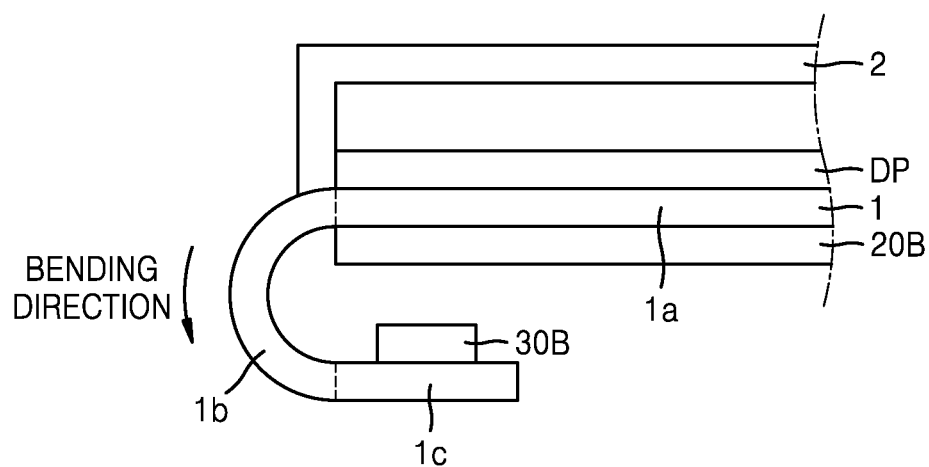

FIGS. 25A and 25B are cross-sectional views illustrating an arrangement of electronic components according to another embodiment.

Referring to FIGS. 25A and 25B, since in the first substrate 1 of the display panel 10A, a non-display area around the display portion DP is bent in a bending direction, the non-display area may not be seen by the user. The bending direction is from the front surface to the rear surface of the first substrate 1.

The first substrate 1 may include a first part 1a corresponding to the display portion DP, a second part 1c facing the first part 1a, and a bending part 1b between the first part 1a and the second part 1c. The rear surface of the second part 1c may face the rear surface of the first part 1a by the illustrated bending direction. The electronic component 30A (30B) may be mounted on the rear surface of the second part 1c. The transmittance control component 20A (20B) may be provided between the first substrate 1 and the electronic component 30A (30B).

Figure 26:
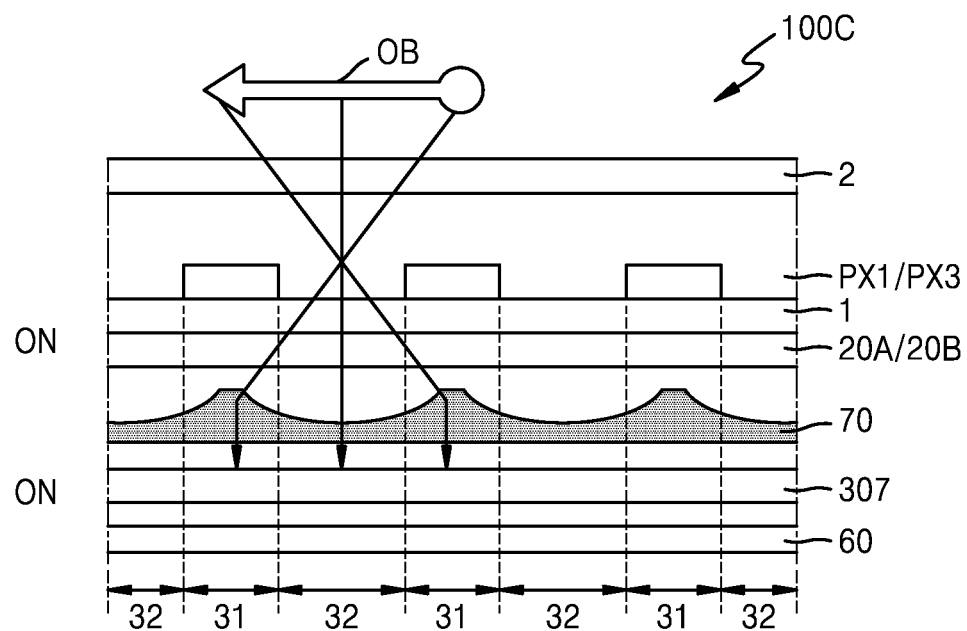
FIG. 26 is a schematic cross-sectional view of a display apparatus according to another embodiment.

FIG. 26 is a schematic cross-sectional view of a display apparatus 100C according to another embodiment.

Referring to FIG. 26, the display apparatus 100C according to the present embodiment may include a lens 70 in addition to the above-described structure of the display apparatus 100A(100B). The lens 70 may be provided between an electronic component 307 and the transmittance control component 20A (20B).

In the embodiment of FIG. 26, the electronic component 307 is an image sensor, and the image sensor is provided corresponding to an area including at least one transmission area 32 and at least one pixel area 31. Since the image sensor is provided across the pixel area 31, light reflected from an object OB located in the pixel area 31 would not ordinarily be incident on the image sensor, and thus image information of the object OB may be lost. However, in the present embodiment, since the lens 70 is provided in front of the image sensor to refract light including information of the object OB through the lens 70 to be incident on the image sensor, the loss of image information of the object OB by being blocked by the pixel area 31 may be reduced.

Figure 27:
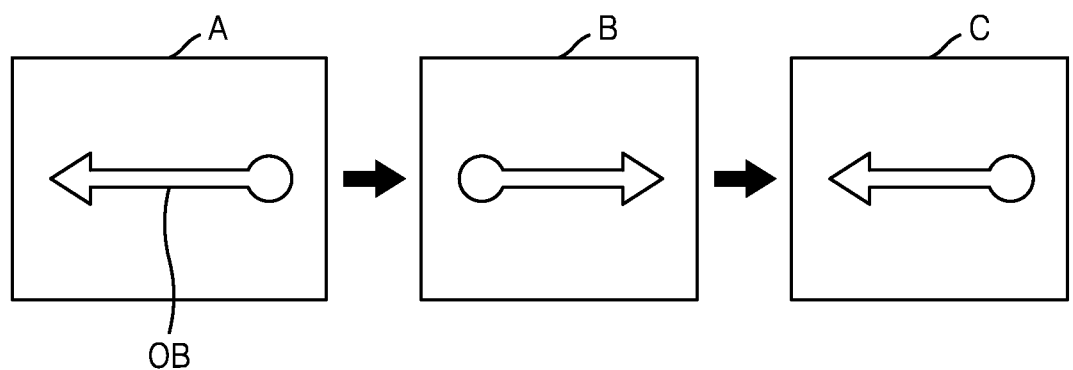
FIG. 27 illustrates correction of image information according to the embodiment of FIG. 26.

FIG. 27 illustrates correction of image information according to the embodiment of FIG. 26.

Referring to FIG. 27, an optical signal of the object OB input to the image sensor after passing through the lens 70 may be image data B that is reversed left and right. The controller 40A (40B) may convert the optical signal input to the image sensor to the image data B, reverse the left and right sides of the image data B, and output image data C that is color recovered through image processing for noise removal and blur improvement with respect to the image data B. The reversing and image processing of image data is not particularly limited, and, in light of the present disclosure, various well-known methods may be employed. For example, the controller 40A (40B) may perform image processing by using various deep learning techniques such as deep neural networks (DNN), convolutional neural networks (CNN), or deep believe networks (DBN).

Figure 28A:
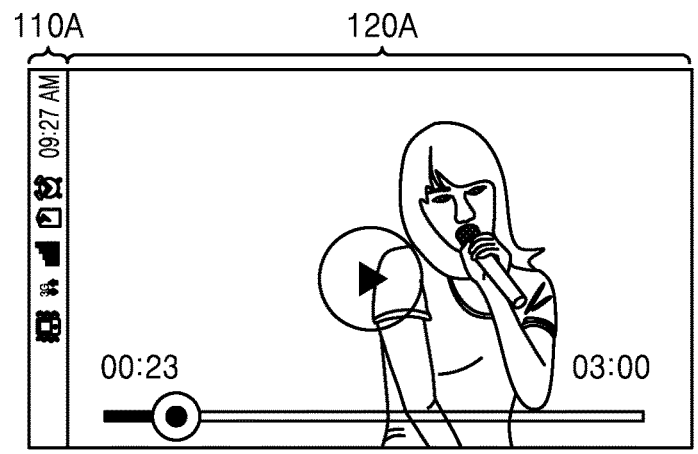
FIGS. 28A, 28B, and 28C illustrate an example of a method of providing an image through a display apparatus.
Figure 28B:
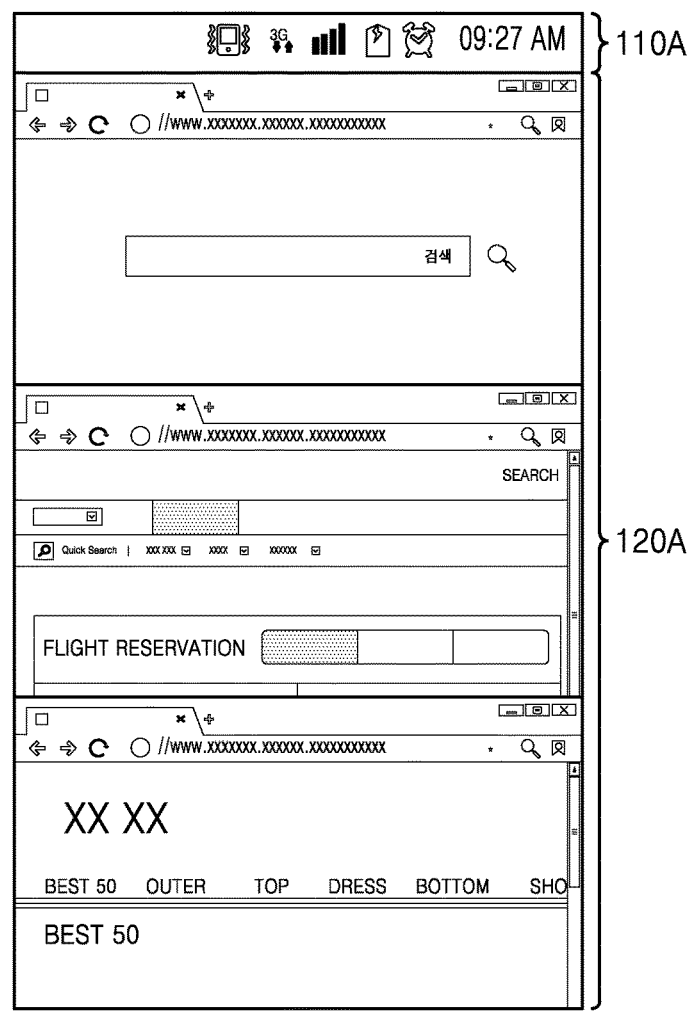

FIGS. 28A and 28B illustrate an example of a method of providing an image through the display apparatus 100A.

As illustrated in FIGS. 28A and 28B, the display apparatus 100A may independently display images on the first display portion 110A and the second display portion 120A.

State information such as a communication service provider, information about an operating application, an indication of a newly received alarm, or a current time may be displayed on the first display portion 110A.

Figure 28C:
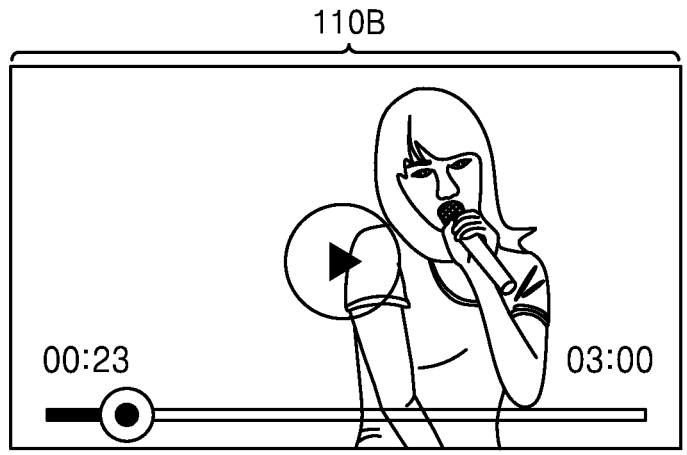

FIG. 28C illustrates an example of a method of providing an image through the display apparatus 100B.

As illustrated in FIG. 28C, the display apparatus 100B may display an image with the third display portion 110B providing a full screen. State information may be displayed in a portion of the third display portion 110B according to the user's selection.

Figure 29A:
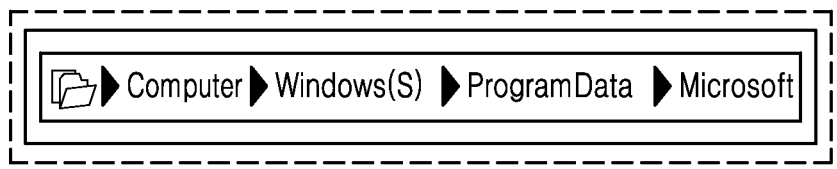
FIGS. 29A, 29B, and 29C illustrate examples of various information displayed on the first display portion.
Figure 29B:
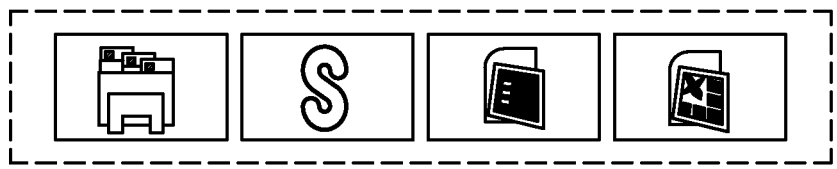
Figure 29C:
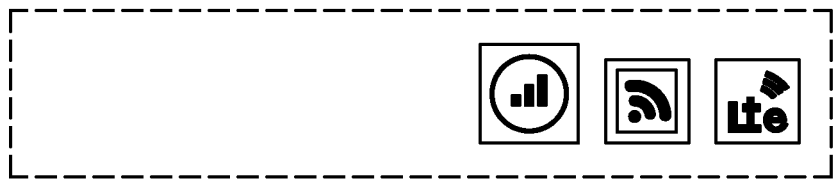

FIGS. 29A, 29B, and 29C illustrate examples of various pieces of information displayed on the first display portion 110A.

As illustrated in FIG. 29A, the first display portion 110A may provide a user interface (UI) function of displaying a path or depth of a folder. An overall folder position at a current position when a file management job such as search, copy, or move of a file by a user may be displayed on the first display portion 110A.

As illustrated in FIG. 29B, the first display portion 110A may provide an intuitive user interface (UI) function of displaying a multi-tasking bar. The first display portion 110A provides a task progress state indication, and enables a user to directly select a task.

As illustrated in FIG. 29C, the first display portion 110A may provide a user interface (UI) function of displaying state information, such as charge information and network information.

A video selected by the user or a main image of an Internet search result may be displayed on the second display portion 120A.

Figure 30:
FIG. 30 is a cross-sectional view of an example of a transmittance control component according to an embodiment.

FIG. 30 is a cross-sectional view of an example of a transmittance control component according to an embodiment.

Referring to FIG. 30, the transmittance control component 20A (20B) may include the first substrate 1 of the display panel 10A (10B), a third substrate 3 facing a surface opposite to a surface where the display portion DP of the first substrate 1 is provided, and a transmittance control layer TM between the first substrate 1 and the third substrate 3. The third substrate 3 may include at least one transparent material such as glass, silicon, synthetic resin, and/or aerogel. In the present embodiment, an overall thickness of a display apparatus may be reduced because one substrate of the transmittance control component 20A (20B) and one substrate of the display panel 10A (10B) are shared together.

The transmittance control layer TM may include a light absorbing material or a light blocking material. The transmittance control layer TM may include coloring suspended particles in an organic solvent and gel, an electrochromic material having transmittance that is changed by electric oxidation/reduction, liquid crystal and/or dyes having a phase that is changed by a voltage, and/or black ink having transmittance that is controlled according to a movement state by a voltage. The transmittance control layer TM may change transmittance through a state change, phase change, and/or position change of a material between the first substrate 1 and the third substrate 3.

The transmittance control component 20A (20B) is not limited to the above-described embodiment, and may be implemented in various forms. Furthermore, the transmittance control layer TM is not limited to the above-described embodiment. For example, the transmittance control layer TM may be a physical optical element that is controlled to block or transmit light between two substrates by an electromagnetic field, such as a liquid crystal layer.

Although not illustrated, when the electronic component 30A (30B) is an image sensor, a lens may be provided between the transmittance control component 20A (20B) and the image sensor.

The display apparatus according to the above-described embodiments may be implemented in mobile phones, smart phones, notebook computers, terminals for digital broadcast, personal digital assistants (PDA), portable multimedia players (PMP), or navigation devices.

Although in the display apparatus according to the above-described embodiments, the transmission area transmits light, the embodiments of the present disclosure are not limited thereto. For example, the transmission area of the display apparatus may transmit signals such as sound or waves with a frequency other than that of light, and the electronic component may include a speaker, a microphone, or an antenna.

When an electronic component is provided by using a penetration portion that penetrates a non-display area around the display portion or a part of the display portion, the non-display area and the penetration portion are seen by the user. As the number of the provided electronic components increases, the non-display area and the penetration portion increase, and thus the area of the display portion decreases. In contrast, in the display apparatus according to embodiment of the present disclosure, at least a part of the display portion is implemented by a display portion having a transmission area, and the electronic component is arranged corresponding to the transmission area, and thus a full screen display without a non-display area such as a bezel area or the penetration portion is available while having various electronic components.

Furthermore, in the display apparatus according to embodiments of the present disclosure, the transmittance control component is provided between the display portion having a transmission area and the electronic component, and during driving of an electronic component, displaying an image and observing an external object may be possible through the light transmission of the transmittance control component. Furthermore, as the light transmission of the transmittance control component is prevented during non-driving of the electronic component, the display portion having a transmission area may be able to produce a black color, and the electronic component may be prevented from being seen during displaying an image.

As described above, according to various embodiments of the present disclosure, since the display apparatus includes, in the display portion, the transmission area corresponding to an area where an electronic component such as a sensor is provided, various electronic components are provided and simultaneously full screen display is possible.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A display apparatus comprising:
    a display panel including a first display portion and a second display portion, the first display portion including a first emission device and a transmission area adjacent to the first emission device, and the second display portion including a second emission device and a non-emission area adjacent to the second emission device;
    an electronic component facing one surface of the display panel and arranged to correspond to at least the transmission area of the first display portion; and
    wherein each of the first emission device and the second emission device comprises:
    a first electrode;
    a second electrode facing the first electrode; and
    an emission layer between the first electrode and the second electrode, and
    wherein an insulating layer is disposed on the first electrodes of the first and second emission devices, the insulating layer including a first opening correspond to a part of the first electrode of the first emission device, a second opening corresponding to the transmission area of the first display portion and a third opening corresponding to a part of the first electrode of the second emission device, and the insulating layer disposed in the non-emission area in the second display portion.

2. The display apparatus of claim 1, further comprising a driver configured to drive each of the first display portion and the second display portion independently from each other.

3. The display apparatus of claim 1, further comprising a lens between the display panel and the electronic component, wherein the electronic component includes an image sensor.

4. The display apparatus of claim 3, further comprising a controller configured to convert an optical signal passing through the lens and incident on the image sensor into image data and perform color restoration on the image data.

5. The display apparatus of claim 1, the display panel comprises:
    a substrate having a first surface on which the first emission device and the second emission device are provided; and
    wherein the electronic component faces a second surface opposite to the first surface of the substrate.

6. The display apparatus of claim 5, further comprising a sealing substrate on the substrate.

7. The display apparatus of claim 5, further comprising a thin film encapsulation layer on the substrate, the thin film encapsulation layer comprising at least one inorganic layer and at least one organic layer.

8. The display apparatus of claim 5, wherein the substrate includes a first part, a second part, and a bending part between the first part and the second part,
    a second surface of the first part and a second surface of the second part face each other,
    the first display portion and the second display portion are provided on a first surface of the first part, and
    the electronic component is provided on a second surface of the second part.

9. The display apparatus of claim 1, wherein the transmission area of the first display portion is configured to transmit external light and the non-emission area of the second display portion is configured not to transmit the external light.

10. The display apparatus of claim 1, further comprising:
    a first transistor electrically connected to the first emission device; and
    a second transistor electrically connected to the second emission device,
    wherein the second transistor of the second emission device is disposed in the non-emission area.

11. The display apparatus of claim 9, wherein the external light includes ambient light and light emitted from the electronic component.

12. The display apparatus of claim 1, wherein an arrangement of first emission devices of the first display portion and an arrangement of second emission devices of the second display portion are different from each other.

13. A display apparatus comprising:
    a substrate comprising a first display portion and a second display portion;
    a first emission device and a transmission area adjacent to the first emission device, in the first display portion;
    a second emission device and a non-emission area adjacent to the second emission device, in the second display portion; and
    an electronic component under the substrate and arranged to correspond to at least the transmission area of the first display portion; and
    wherein each of the first emission device and the second emission device comprises:
    a first electrode;
    a second electrode facing the first electrode; and
    an emission layer between the first electrode and the second electrode, and
    wherein an insulating layer is disposed between the substrate and the first electrodes of the first and second emission devices, the insulating layer including a first opening correspond to a part of the first electrode of the first emission device, a second opening corresponding to the transmission area of the first display portion and a third opening corresponding to a part of the first electrode of the second emission device, and the insulating layer disposed in the non-emission area in the second display portion.

14. The display apparatus of claim 13, further comprising a driver configured to drive each of the first display portion and the second display portion independently from each other.

15. The display apparatus of claim 13, further comprising a lens between the substrate and the electronic component, wherein the electronic component includes an image sensor.

16. The display apparatus of claim 13, further comprising a sealing substrate on the substrate.

17. The display apparatus of claim 13, further comprising a thin film encapsulation layer on the substrate, the thin film encapsulation layer comprising at least one inorganic layer and at least one organic layer.

18. The display apparatus of claim 13, wherein the substrate includes a first part, a second part, and a bending part between the first part and the second part, a second surface of the first part and a second surface of the second part face each other, the first display portion and the second display portion are provided on a first surface of the first part, and the electronic component is provided on a second surface of the second part.

19. The display apparatus of claim 13, further comprising:

a first transistor electrically connected to the first emission device; and a second transistor electrically connected to the second emission device, wherein the second transistor of the second emission device is disposed in the non-emission area.

20. The display apparatus of claim 13, wherein an arrangement of first emission devices of the first display portion and an arrangement of second emission devices of the second display portion are different from each other.

* * * * *